(12) United States Patent
Sakamoto et al.

(10) Patent No.: US 6,339,514 B1
(45) Date of Patent: Jan. 15, 2002

(54) MAGNETIC RECORDING AND REPRODUCING APPARATUS

(75) Inventors: Keiji Sakamoto, Osaka; Akio Konishi, Hyogo; Koichiro Hirabayashi; Shigeo Ueda, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/423,900

(22) PCT Filed: Mar. 15, 1999

(86) PCT No.: PCT/JP99/01249

§ 371 Date: Feb. 11, 2000

§ 102(e) Date: Feb. 11, 2000

(87) PCT Pub. No.: WO99/48093

PCT Pub. Date: Sep. 23, 1999

(30) Foreign Application Priority Data

Mar. 16, 1998 (JP) .......................................... 10-065006

(51) Int. Cl.⁷ .......................................... G11B 15/675
(52) U.S. Cl. .................................................... 360/96.5
(58) Field of Search ........................... 360/96.5, 90, 93, 360/94, 25, 96.6, 83, 84, 85, 72.3, 74.5, 74.6

(56) References Cited

U.S. PATENT DOCUMENTS

| 5,001,810 A | * | 3/1991 | Baer .......................... 16/302 |
| 5,328,124 A | * | 7/1994 | Tsuchiya et al. ............ 242/337 |
| 5,432,654 A | * | 7/1995 | Ooka .......................... 360/92 |
| 5,493,459 A | * | 2/1996 | Shiomi ........................ 360/94 |
| 5,523,907 A | * | 6/1996 | Seo et al. ................... 360/96.5 |
| 5,621,589 A | * | 4/1997 | Noriyuki et al. ........... 360/96.5 |
| 5,828,517 A | * | 10/1998 | Asakura .................... 360/96.5 |
| 5,943,183 A | * | 8/1999 | Kobayashi ................. 360/96.5 |
| 6,072,658 A | * | 6/2000 | Kumagai ................... 360/96.5 |

FOREIGN PATENT DOCUMENTS

| JP | 61-86830 | 6/1986 |
| JP | 7-45045 | 2/1995 |
| JP | 8-315470 | 11/1996 |
| JP | 10-188392 | 7/1998 |

* cited by examiner

Primary Examiner—William Klimowicz
Assistant Examiner—Tianjie Chen
(74) Attorney, Agent, or Firm—Wenderoth, Lind & Ponack, L.L.P.

(57) ABSTRACT

The invention presents a magnetic recording and reproducing apparatus capable of reducing the size and preventing external force from propagating directly to the internal mechanism. To achieve the object, a main arm 26 and a sub-arm 29 are constituted so as not to intersect with a photo detector 31 always during rotating operation within a plane including the photo detector 31, and the dimension can be hence reduced in the width direction of the apparatus, and moreover as the wall thickness of MIC-SW 46 is reduced, the upper end of the MIC-SW 46 is held by a back plate 48, so that the dimension of the apparatus can be reduced also in the depth direction, and further a cassette holder 13 is locked by a damper 42 to prevent effects from outside when a sub-chassis 19 moves from unloading position to loading position.

6 Claims, 22 Drawing Sheets

102a

MAGNETIC RECORDING AND REPRODUCING APPARATUS

TECHNICAL FIELD

The present invention relates to a magnetic recording and reproducing apparatus for installing a box-shaped cassette into a video cassette recorder (VCR hereinafter) audio cassette recorder, or the like.

BACKGROUND ART

The recent market demands for a VCR integrally combined with a camera are diversified. Not only is reduction in size and weight demanded, but also digitization to prevent deterioration of signals is also demanded. By digitization, the quantity of information is greatly increased as compared with the conventional capacity, and the size of the cassette incorporating a tape is rapidly getting smaller due to the progress in the signal compression technology and high density recording technology. Also, the cassettes possessed by users are increasing year after year, and a VCR system capable of easily retrieving the type of cassette or retrieving the information recorded on the tape is being demanded.

As an example to satisfy such market needs, the household digital VCR (DVC hereinafter) conforming to the DV standard is known. In the DVC, a ferromagnetic metal material is applied or evaporated onto the tape, and the recording density is enhanced by short wavelength recording. A perspective view showing the appearance of a DVC cassette is given in FIG. 22. At the back side of the DVC cassette, an ID board 102a is provided, and by the resistance value of the circuit board read through a contact type recognition switch (MIC-SW hereinafter) mentioned below, the tape thickness, tape material, and other information can be detected.

A conventional magnetic recording and reproducing apparatus is described below while referring to the accompanying drawings.

FIG. 16 is a plan view of a conventional magnetic recording and reproducing apparatus in an unload position, FIG. 17 is a magnified plan view of essential parts of FIG. 16, FIG. 18 is a plan view in a loading completed position, FIG. 19 is a right side view of FIG. 16 in a cassette attaching and detaching position, FIG. 20 is a right side view of FIG. 16 of the cassette in a tape loading position, and FIG. 21 is a right side view of FIG. 18.

In FIG. 16 and FIG. 20, a rotary head cylinder 101 is installed in a main chassis 100, and signals are exchanged with a tape (not shown) incorporated in a cassette 102. A sub-chassis 104 is slidably placed on a sub-chassis guide pin 103 set up in the main chassis 100. As shown in FIG. 19, one end of a main arm 106 rotatably supported on a main arm shaft 105 provided in the sub-chassis 104 is slidably engaged with a main arm pin 108 provided at the side of a cassette holder 107 for conveying the cassette 102.

A a sub-arm shaft 110 is provided at the side of the cassette holder 107 to which an outer panel 109 is attached to the upper part thereof, and a sub-arm 111 is rotatably supported. The leading end of the sub-arm 111 is slidably engaged with a sub-arm pin 112 provided at the side of the sub-chassis 104. The main arm 106 and sub-arm 111 are rotatably engaged with each other about an arm coupling pin 113, and an up-spring 114 is stretched between them, so that the cassette holder 107 is always thrust to move in the direction of arrow A in FIG. 19.

As shown in FIG. 16, FIG. 18, and FIG. 20, a light emitter 115 is disposed at a specified position on the sub-chassis 104, and the light 116 emitted from the light emitter 115 is divided into two directions as indicated by the twin dot chain line, passes through the tape in the cassette 102 and a slot 110a in the sub-arm 111, and reaches a photo detector 117 provided at the side of the sub-chassis 104. Depending on whether or not this light 116 reaches the photo detector 117, the tape starting or ending position can be detected.

Further, a lock rod 119 is slidably provided on a guide pin 118 formed at the side of the sub-chassis 104, and it is thrust in the direction of arrow C in FIG. 19 by a lock spring 120. A lock pin 121 set up on the lock rod 119 is provided at a position to be engaged with a lock engaging portion 107a formed in the cassette holder 107, and the cassette holder 107 is designed to have a slight play after locking so as to be movable somewhat in the direction of arrow B, so that the lock pin 121 can securely contact the stopping portion 107b of the engaging portion 107a.

In addition, as shown in FIG. 19 or FIG. 20, a contact type recognition switch (MIC-SW) 122 is provided at a position to be engaged with the ID board 102a at the back side of the cassette 102. To insulate all but a contact terminal 122a, the housing 122b for holding the contact terminal 122a is generally made of a resin material. The contact terminal 122a is made of an elastic conductive material, and the resistance value of the ID board 102a can be read by applying a specified pressure.

In this conventional magnetic recording and reproducing apparatus, the operation is described below.

In FIG. 19, when the cassette 102 is put into the cassette holder 107 in the direction of arrow C, and the outer panel 109 is pressed in the direction of arrow B, the cassette holder 107 is lowered as being guided by the main arm 106 and sub-arm 111. When the lock engaging portion 107a of the cassette holder 107 contacts with the lock pin 121, the lock rod 119 slides in the direction of arrow D, and the moment the lock engaging portion 107a passes the lock pin 121, the lock rod 119 returns to the position shown in FIG. 20 due to the thrusting force of the lock spring 120.

After locking the cassette holder 107, when the outer panel 109 is pressed in the direction of arrow B in FIG. 20, the cassette holder 107 is pushed by virtue of the play mentioned above, but when the pushing force is released, it stops at the position shown in FIG. 20 due to the restoring force of the up-spring 114. When the cassette holder 107 descends, the optical path from the light emitter 115 to the photo detector 117 is temporarily shut off by the sub-arm 111, but at the end of descending, the optical path is formed as shown in FIG. 16 and FIG. 20. Thereafter, the sub-chassis 104 mounting the cassette holder 107 is guided by the sub-chassis guide pin 103, and is moved to the rotary head cylinder 101 side, so that the tape can be recorded or reproduced.

The conventional construction; however, has the following three problems.

(1) Since the moving trajectory of the sub-arm intersects with the detection direction of the photo detector, the photo detector must be placed at the outside of the sub-arm, i.e. at the side of the sub-arm that is opposite to the cassette. Therefore, minimizing the width of this mechanism is restricted, and the entire apparatus cannot be reduced much in size.

(2) The MIC-SW is made of a resin material in order to assure its own rigidity and the reliability of operation, and hence a certain thickness is required; however, this thickness becomes a dominant factor for determining the depth of the recognition switch, and hence reducing the depth of the recognition swtich is limited. If an ultra-thin MIC-SW is made, the verticality of the MIC-SW to the chassis is not assured, and fluctuations of contact pressure of the contact terminal with the ID board increase, whereby the reliability of operation of the apparatus becomes inferior.

(3) Since the outer panel and the cassette holder are integrally composed, the external force acting on the outer panel directly propagates to internal mechanisms through the cassette holder. Therefore, in the case of the camera-VCR integrated unit, since the user directly touches the outer panel when operating the unit, the apparatus or the cassette may be distorted or deformed, and the reliability may be spoiled, and hence the quality of the product may be lowered.

The invention is intended to solve these problems of the prior art, and it is hence an object thereof to present a magnetic recording and reproducing apparatus suited to reduction in size and high operation reliability.

SUMMARY OF THE INVENTION

To solve the problems of the prior art, the magnetic recording and reproducing apparatus of the invention is characterized by a construction in which the moving trajectory of the sub-arm due to vertical movement of the holder when loading or unloading the cassette does not intersect with the detection direction of the photo detector, and the wall thickness of the cassette judging structure (MIC-SW) is thin. Also, a protecting mechanism for gripping the MIC-SW is provided, and an external force acting on the outer panel is prevented from being applied directly to the cassette holder.

In such construction, the width and/or depth dimension of the apparatus can be reduced, and the cassette and the internal mechanisms are not distorted or deformed due to any external force during operation of the apparatus, so that a highly reliable magnetic recording and reproducing apparatus may be realized.

More specifically, according to a first aspect of the invention, the invention relates to a magnetic recording and reproducing apparatus comprising a chassis, a cassette holder for holding a cassette incorporating a tape, and a moving mechanism composed of a pair of mutually rotatably supported arms. The moving mechanism is for reciprocally moving the cassette holder between a first position for attaching or detaching the cassette to or from the cassette holder, and a second position for placing the cassette in the chassis. The magnetic recording and reproducing apparatus further comprises a detecting mechanism including a detecting member provided adjacent the side of the cassette for detecting the starting or ending position of the tape, and a guide pin provided in the detecting member at the chassis side, such that while the cassette holder is moved reciprocally between the first position and the second position, one of the pair of arms moves at the opposite side of chassis with respect to the detecting member, and the other arm is guided by the guide pin and moves at the chassis side with respect to the detecting member. Therefore, since the pair of arms moves without intersecting with the detection direction of the detecting member, the width of the apparatus can be reduced.

According to a second aspect of the invention, the invention relates to a magnetic recording and reproducing apparatus comprising a chassis, a cassette judging mechanism fixed to the chassis and engageable with the back side of a cassette, for judging the type of the cassette. The apparatus further comprises a protective device provided in the chassis for gripping the cassette judging mechanism.

According to a third aspect of the invention, the protective device is a metal plate member having a pi-shaped protective portion for gripping the upper end of the cassette judging mechanism, and therefore, since the cassette judging mechanism is supported as being fixed by both the chassis and protective device, the depth of the apparatus can be reduced while maintaining the reliability of the cassette judging mechanism.

According to a fourth aspect of the invention, the invention relates to a magnetic recording and reproducing apparatus comprising a main chassis on which a rotary head cylinder is mounted. The apparatus also comprises a cam portion, a sub-chassis reciprocally movable between an unloading position for drawing out a tape from a cassette, and a loading position for recording or reproducing by the rotary head cylinder. A cassette holder is reciprocally movable between an installing position for placing the cassette in the sub-chassis and a cassette attaching/detaching position. A stopping mechanism is engaged with a cam portion of the main chassis. During a released condition of the stopping mechanism, allowed for is reciprocal motion of the cassette holder between the installing position and the cassette attaching/detaching position when the sub-chassis is at the unloading position. And, during a locked condition of the stopping mechanism, allowed for is holding of the cassette holder on the sub-chassis when the sub-chassis is at the loading position.

According to a fifth aspect of the invention, the stopping mechanism is rotatably provided on the sub-chassis, and has one end engaged with the cam portion of the main chassis.

According to a sixth aspect of the invention, the cam portion of the main chassis is composed of a cam face directed in the longitudinal direction parallel to the moving direction of the sub-chassis, and is also composed of a concave face.

In such a construction, when the sub-chassis is at the first position, the stopping mechanism maintains a position for allowing the motion of the cassette holder, and when the sub-chassis is at the second position, the stopping mechanism holds the cassette holder on the sub-chassis, and also clears the engagement between the moving mechanism and the cassette holder. That is, if the user directly touches the outer panel when operating the apparatus, an external force does not propagate to the moving mechanism, and the apparatus or cassette is not distorted or deformed, so that a camera-VCR integrated unit of high reliability and high quality is realized.

PREFERRED EMBODIMENTS

An embodiment of the invention is described below while referring to FIG. 1 through FIG. 15.

Figure 1:
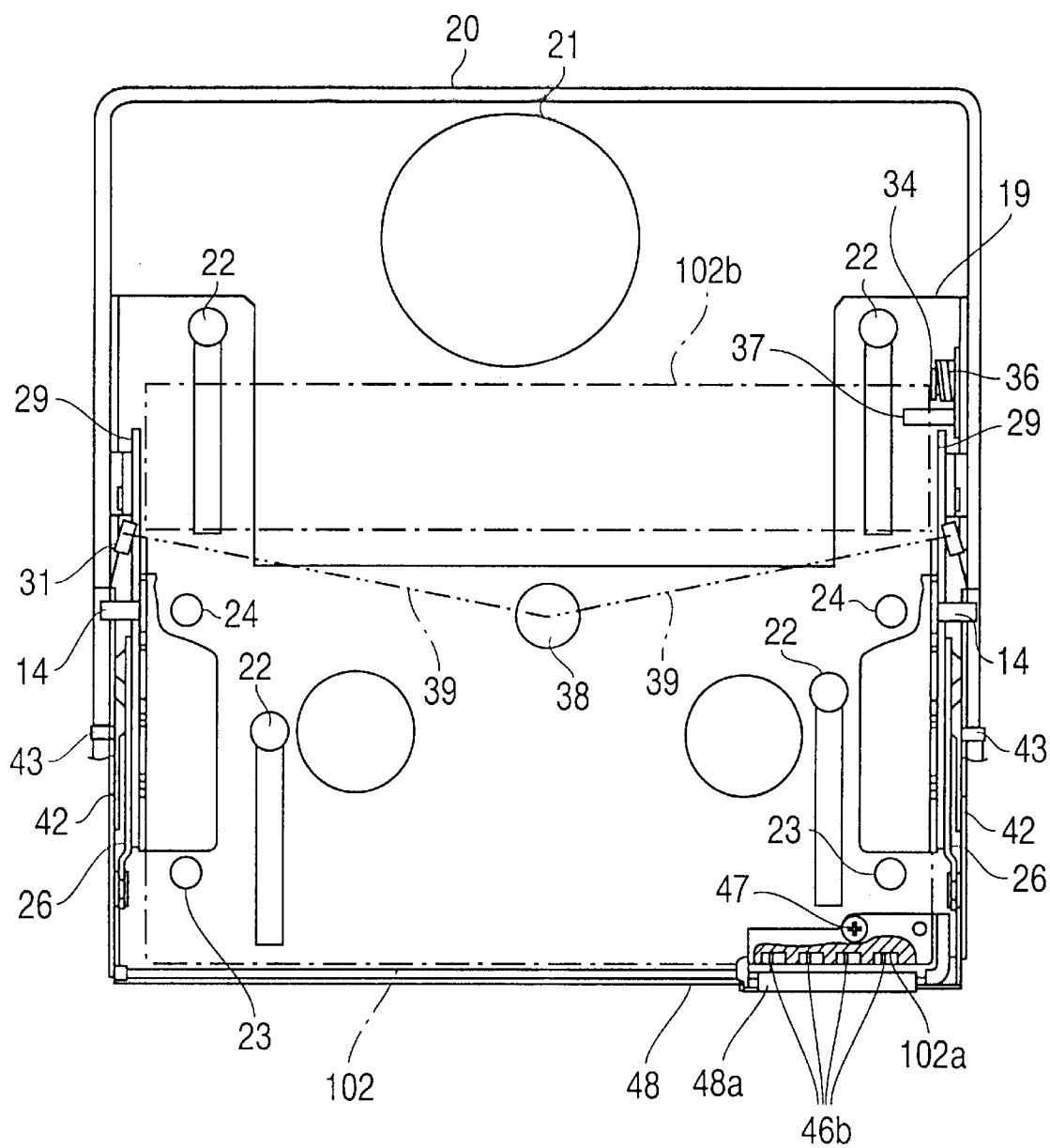
FIG. 1 is a plan view showing a chassis construction in an unload position of a magnetic recording and reproducing apparatus in an embodiment of the invention.
Figure 2:
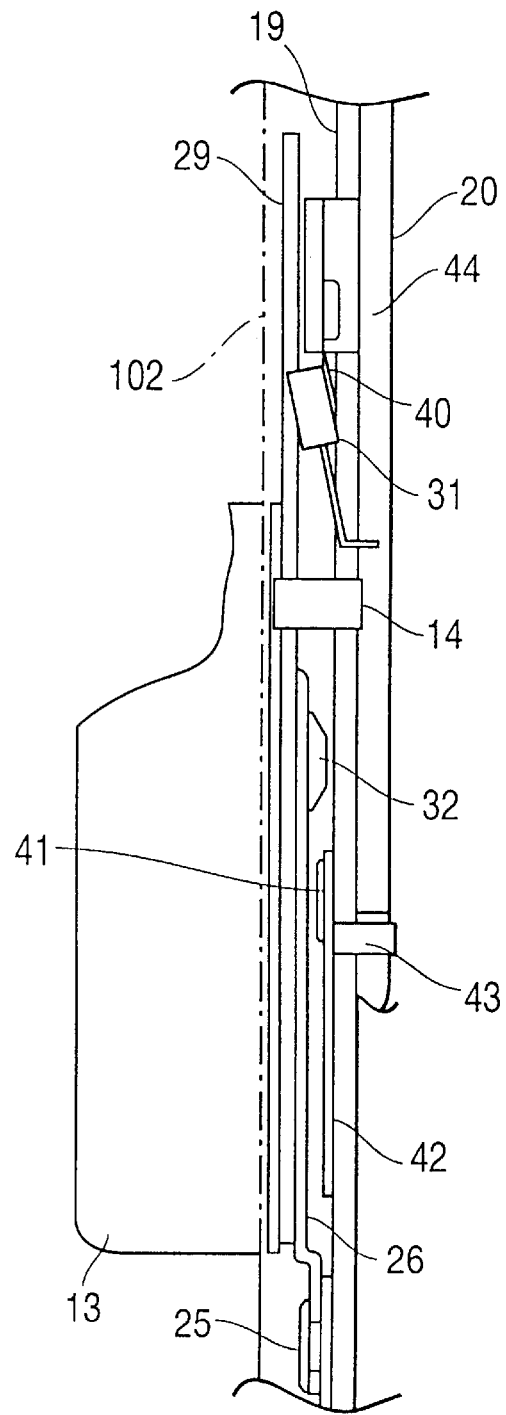
FIG. 2 is a magnified plan view of essential parts of FIG. 1.
Figure 3:
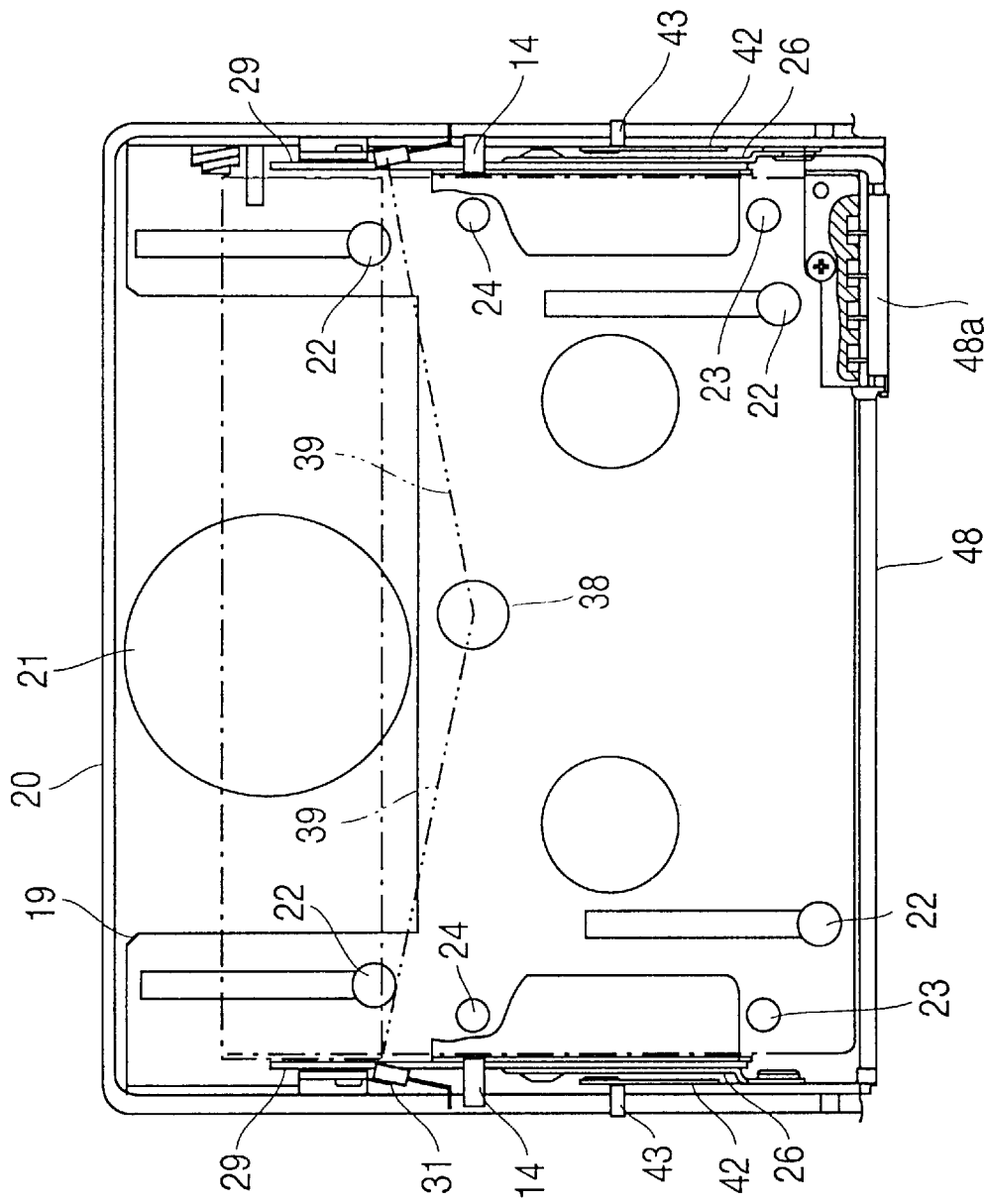
FIG. 3 is a plan view showing a chassis construction, in a loading completed position, of the magnetic recording and reproducing apparatus in the embodiment of the invention.
Figure 4:
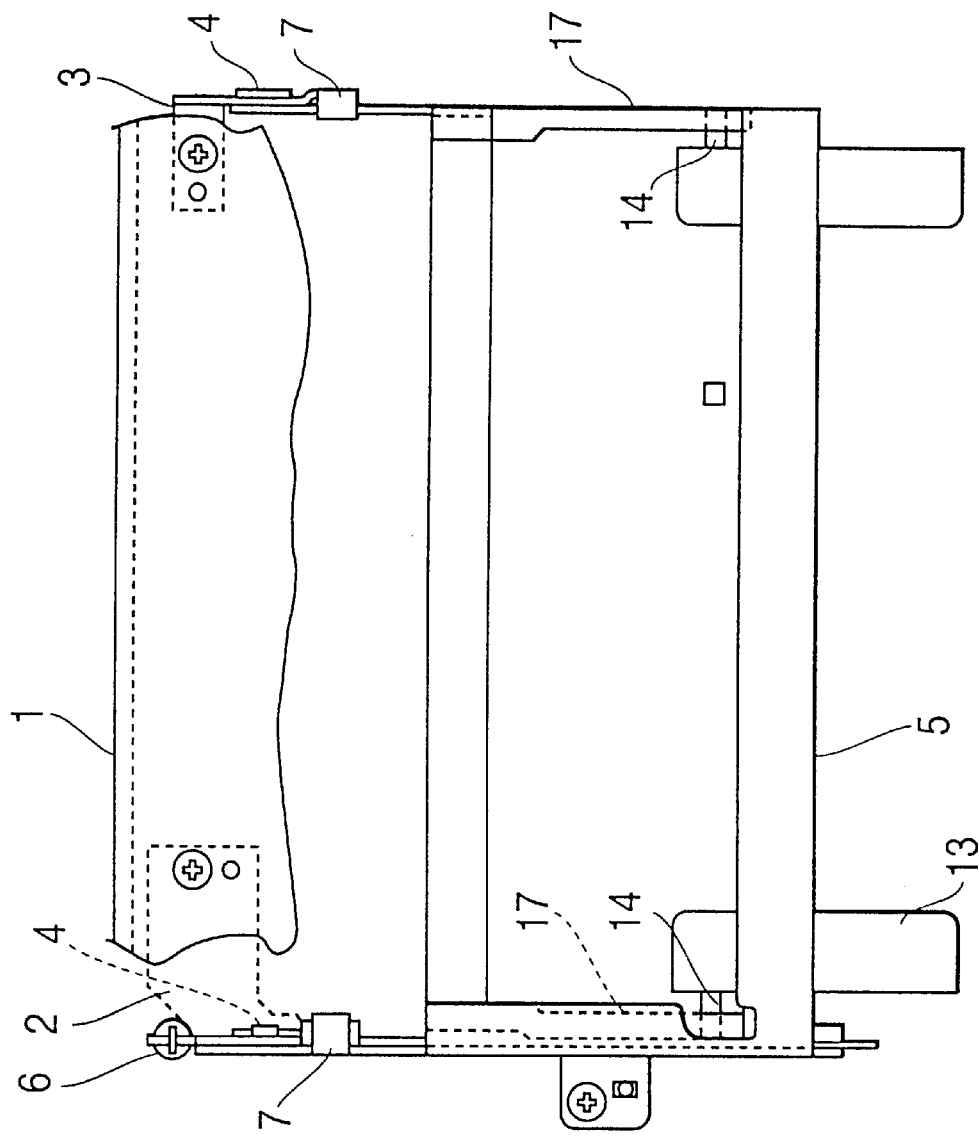
FIG. 4 is a plan view showing a cassette holder moving mechanism provided in an outer casing of the magnetic recording and reproducing apparatus in the embodiment of the invention.
Figure 5:
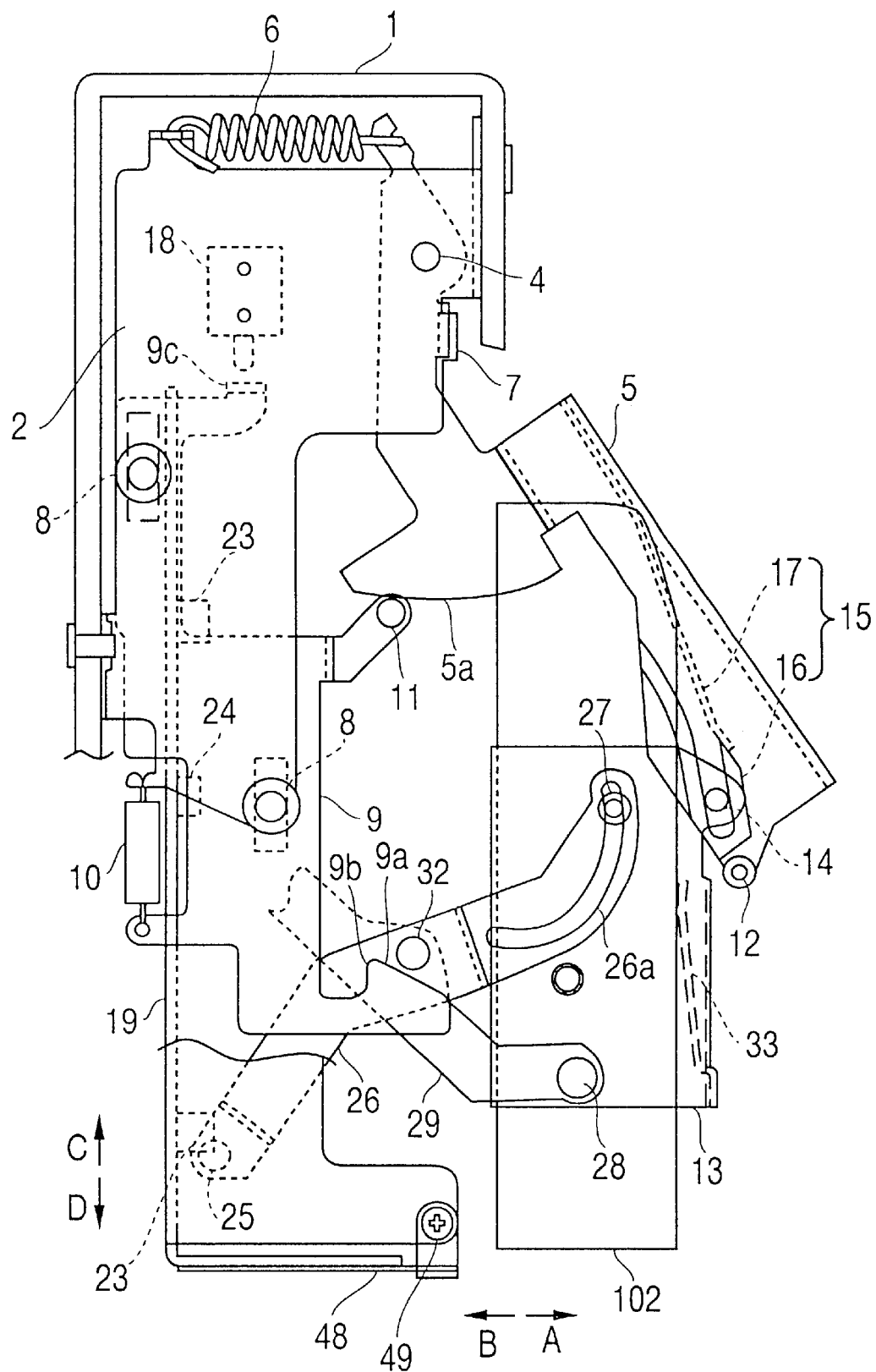
FIG. 5 is a left side view, in a cassette attaching and detaching position, of the magnetic recording and reproducing apparatus in the embodiment of the invention.
Figure 6:
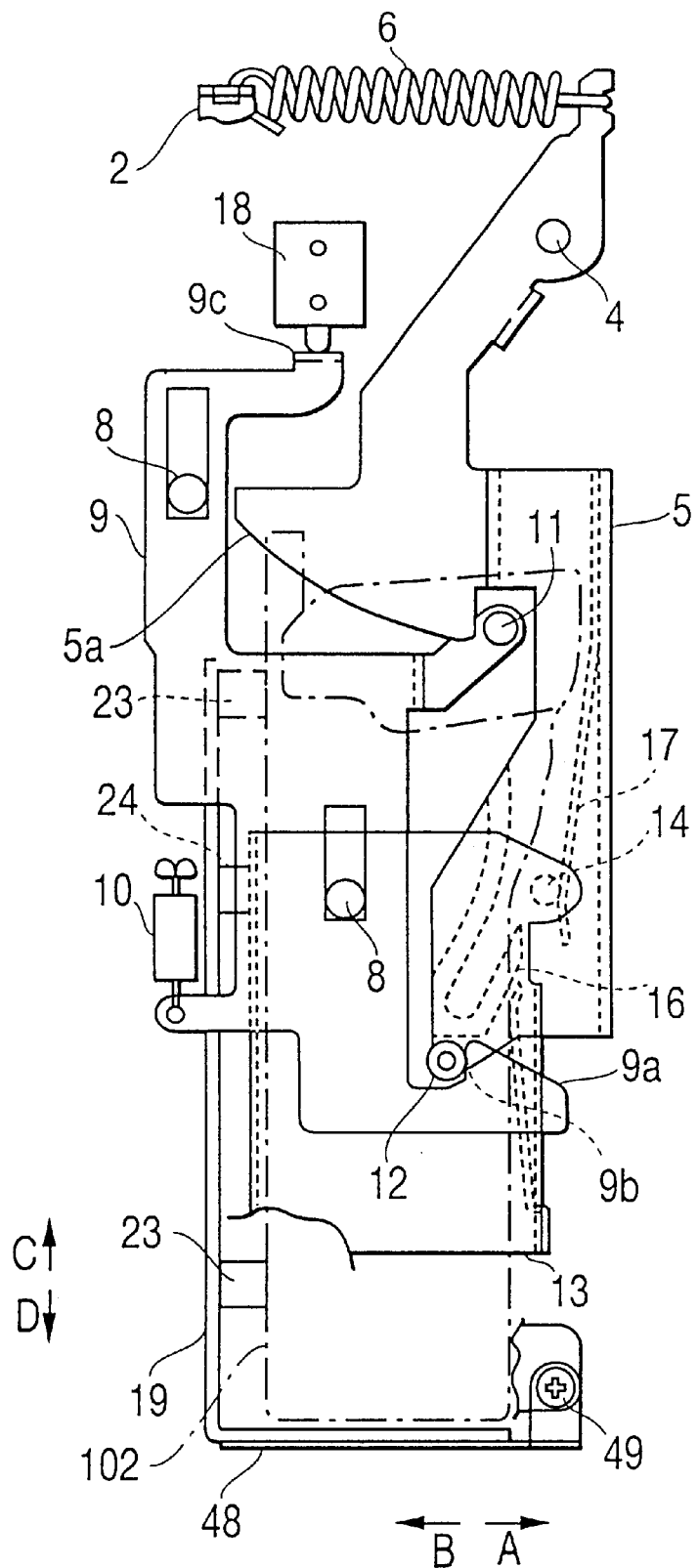
FIG. 6 is a left side view showing the cassette positioned on the sub-chassis in an unload position of the magnetic recording and reproducing apparatus in the embodiment of the invention.
Figure 7:
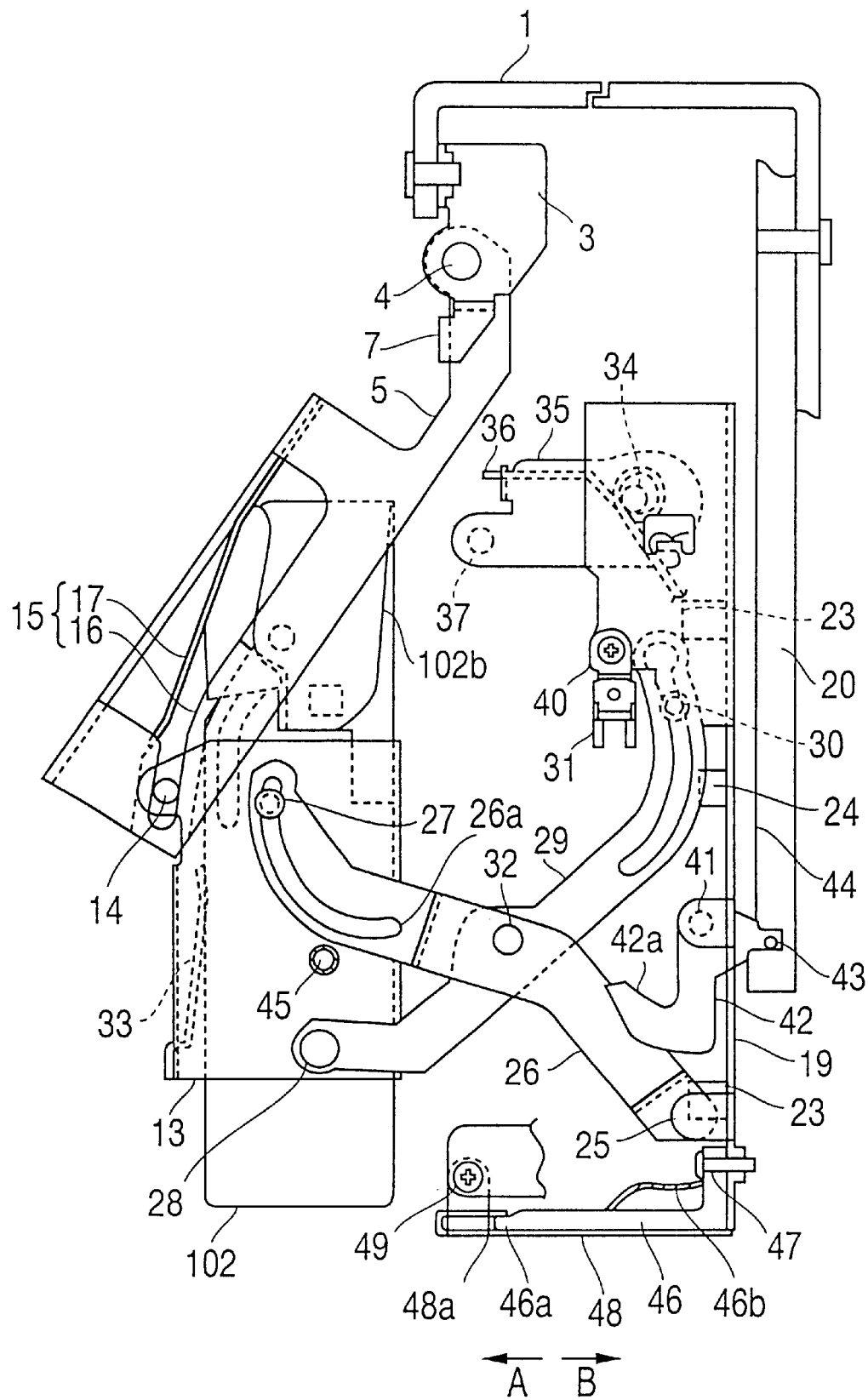
FIG. 7 is a right side view, in a cassette attaching and detaching position, of the magnetic recording and reproducing apparatus in the embodiment of the invention.
Figure 8:
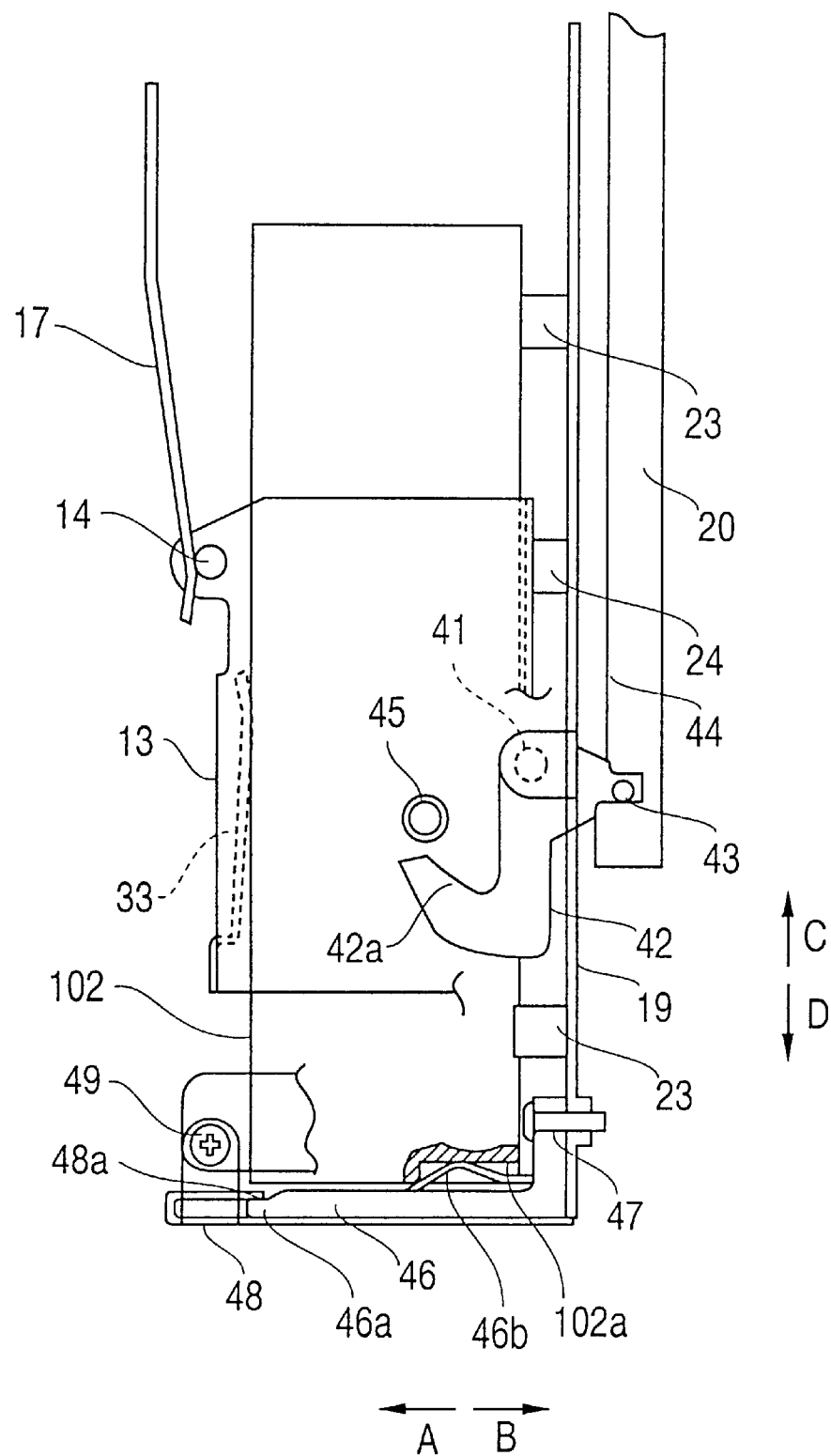
FIG. 8 is a right side view showing the cassette positioned on the sub-chassis in an unload position of the magnetic recording and reproducing apparatus in the embodiment of the invention.
Figure 9:
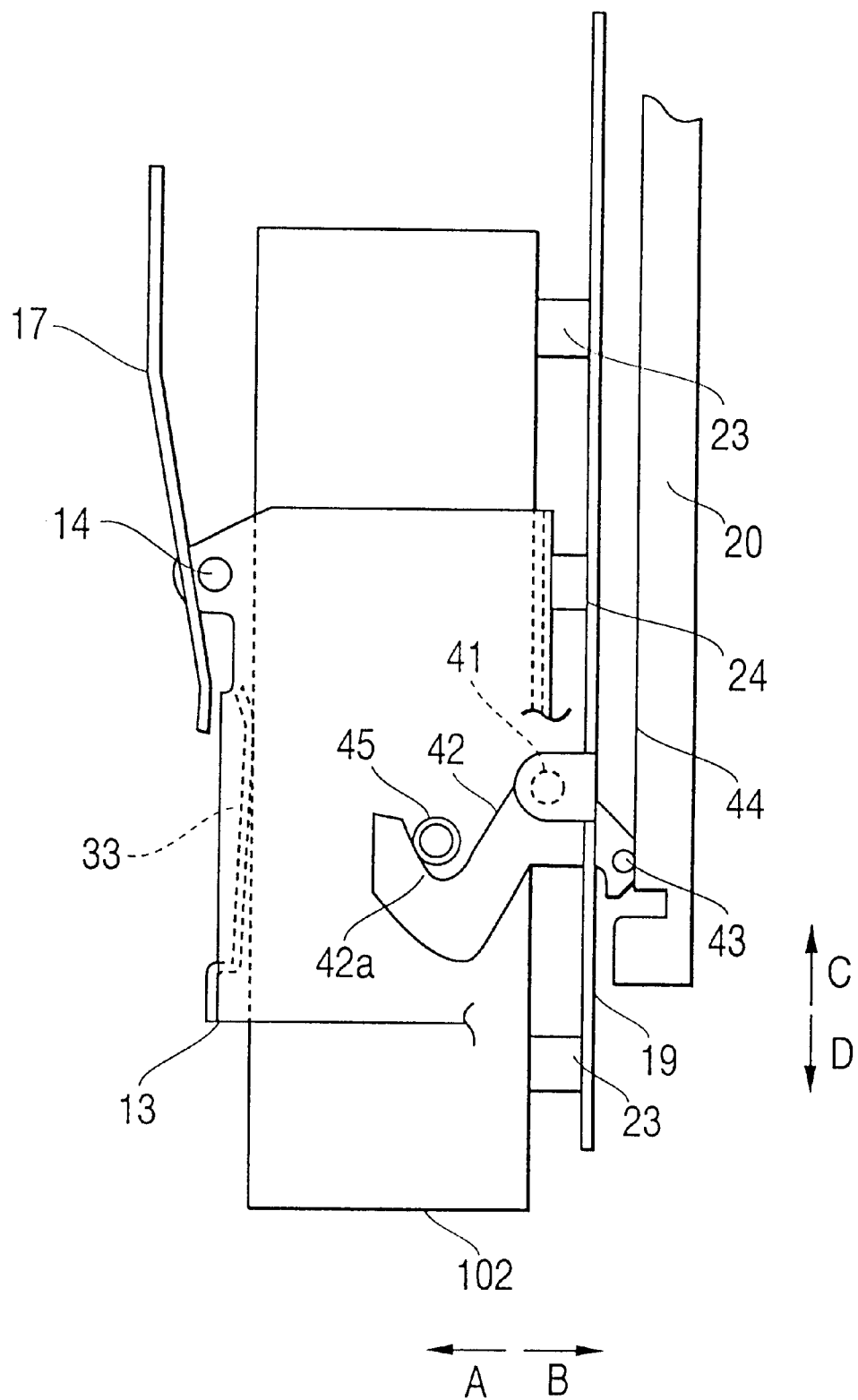
FIG. 9 is a right side view showing operation of a clamper which is a stopping mechanism of the magnetic recording and reproducing apparatus in the embodiment of the invention.
Figure 10:
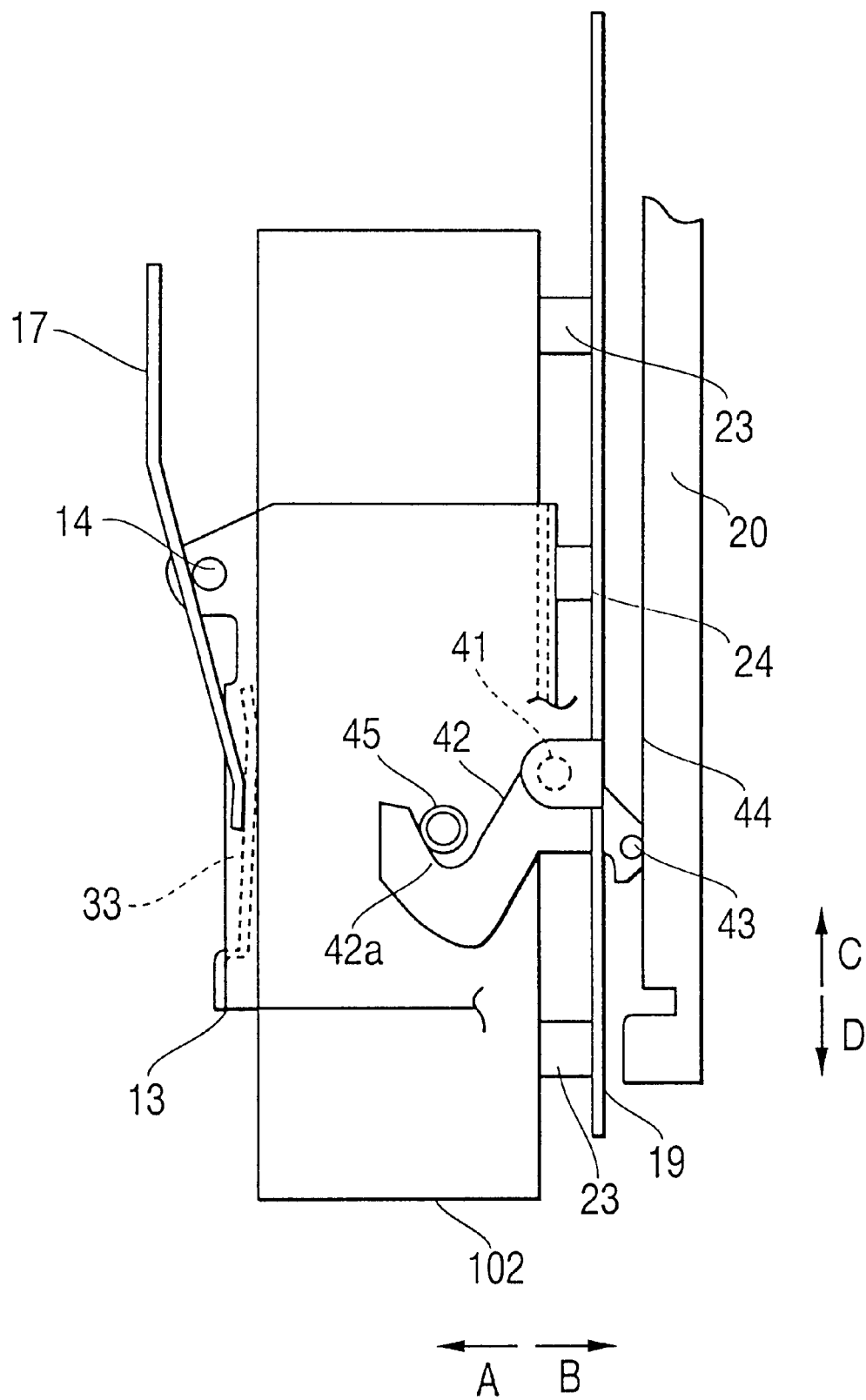
FIG. 10 is a right side view showing operation of the damper which is the stopping mechanism of the magnetic recording and reproducing apparatus in the embodiment of the invention.
Figure 11:
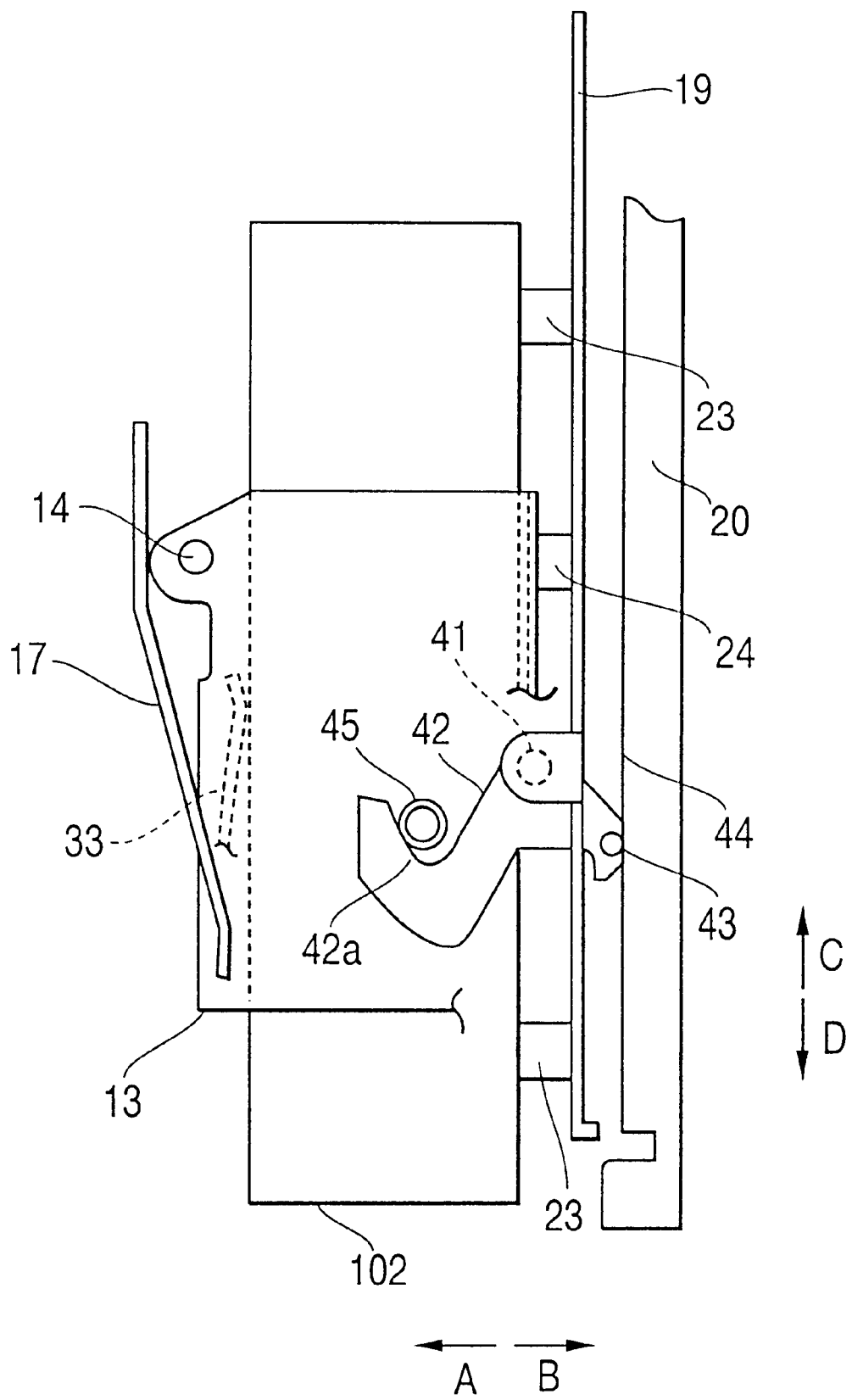
FIG. 11 is a right side view showing operation of the damper which is the stopping mechanism of the magnetic recording and reproducing apparatus in the embodiment of the invention.
Figure 12:
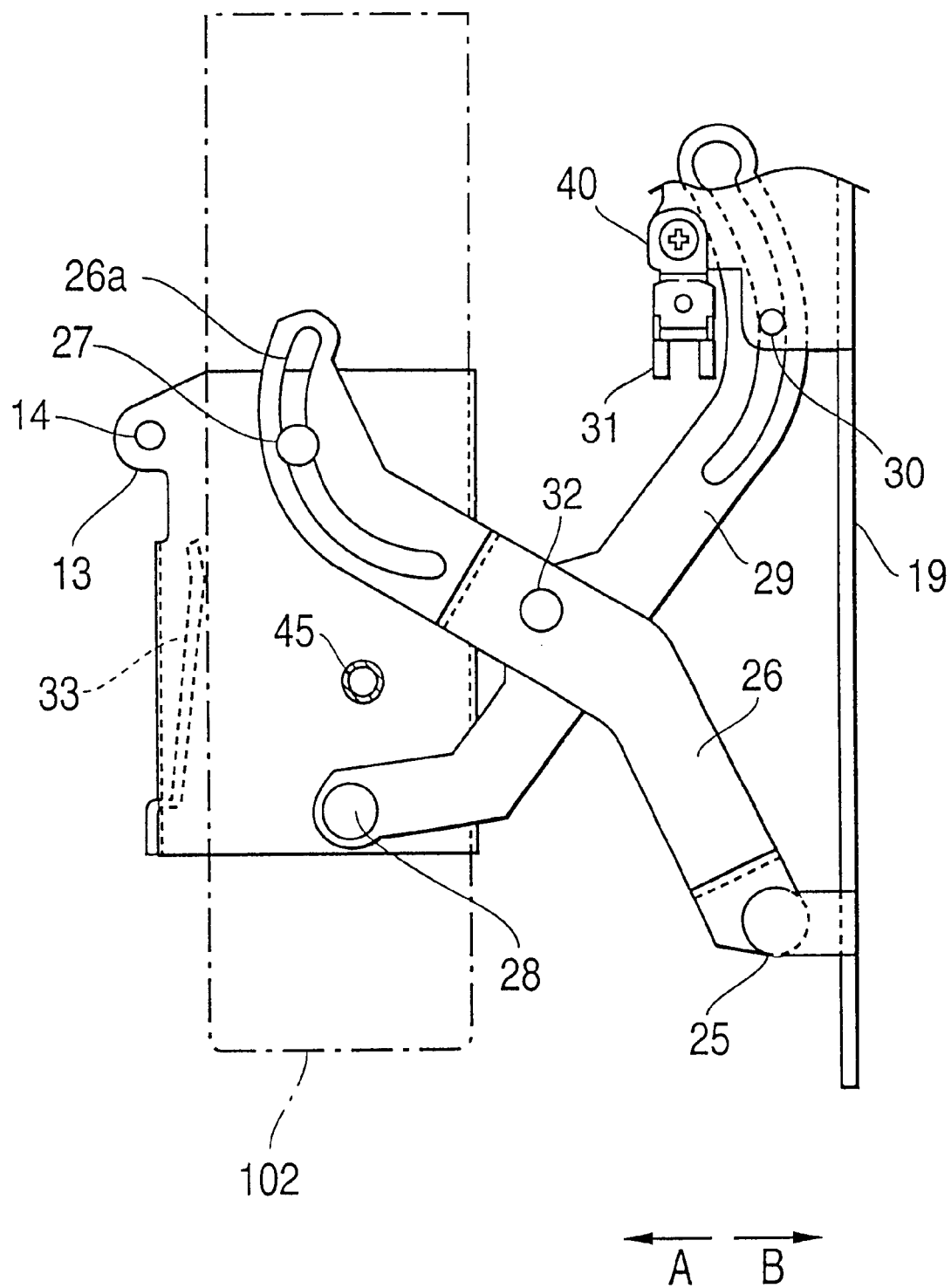
FIG. 12 is a right side view showing ascending and descending motion of a cassette holder of the magnetic recording and reproducing apparatus in the embodiment of the invention.
Figure 13:
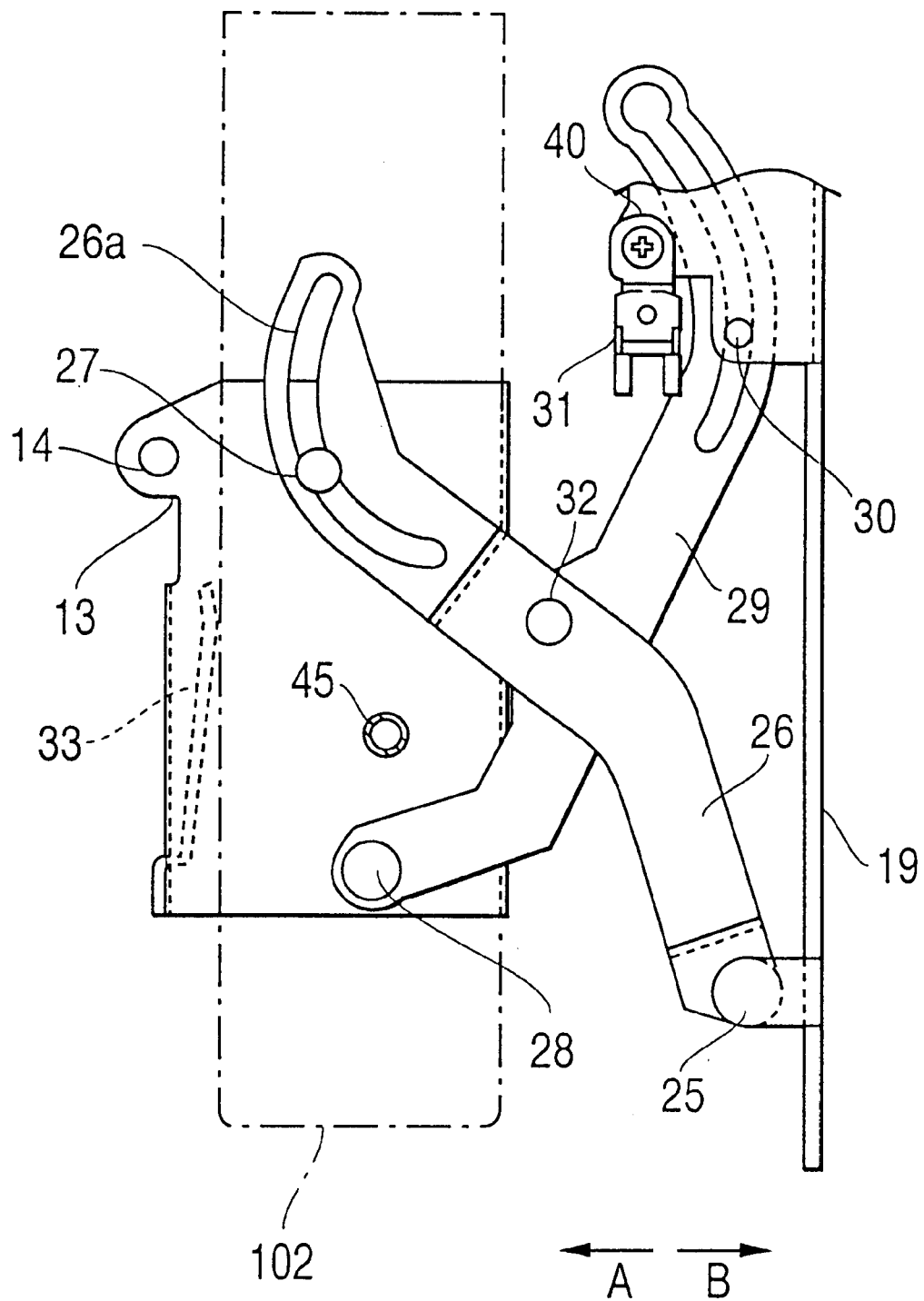
FIG. 13 is a right side view showing ascending and descending motion of the cassette holder of the magnetic recording and reproducing apparatus in the embodiment of the invention.
Figure 14:
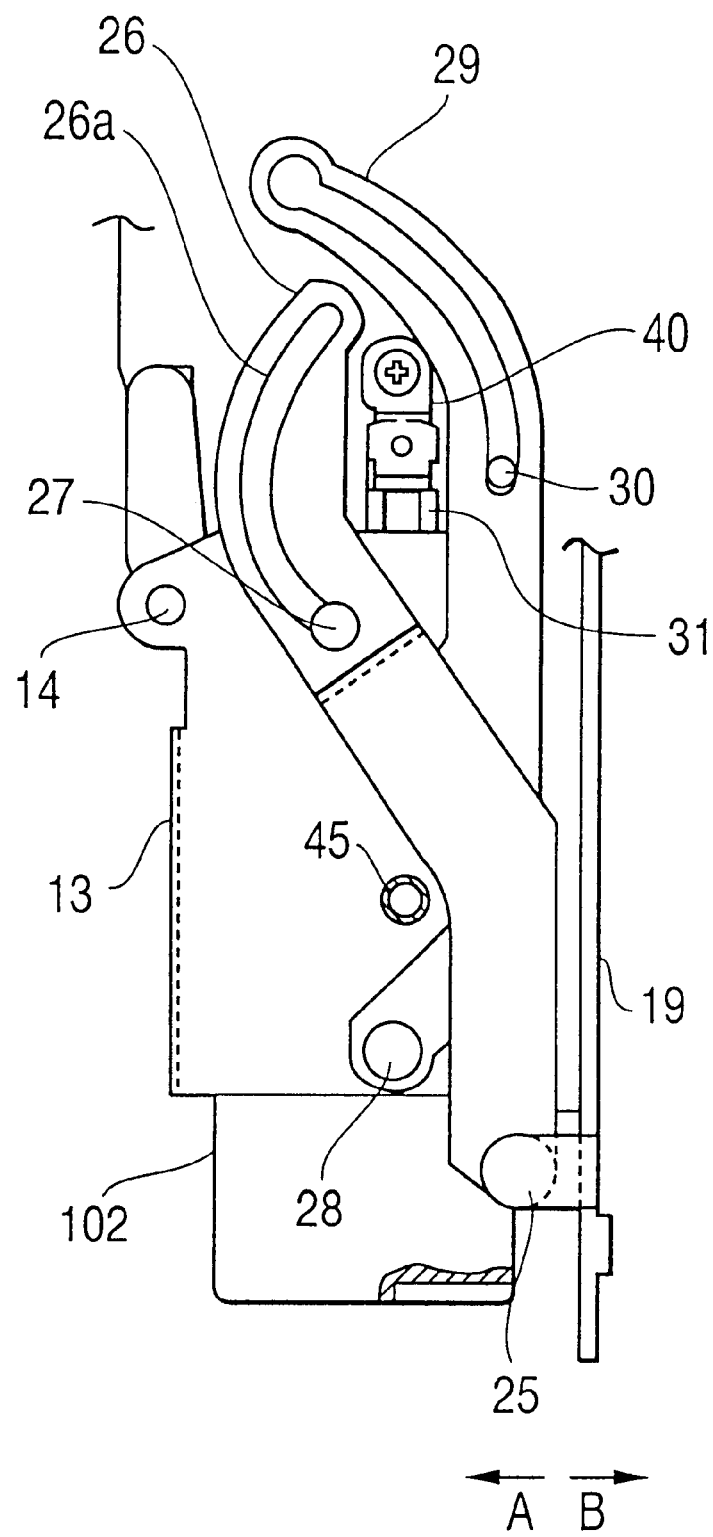
FIG. 14 is a right side view showing ascending and descending motion of the cassette holder of the magnetic recording and reproducing apparatus in the embodiment of the invention.
Figure 15:
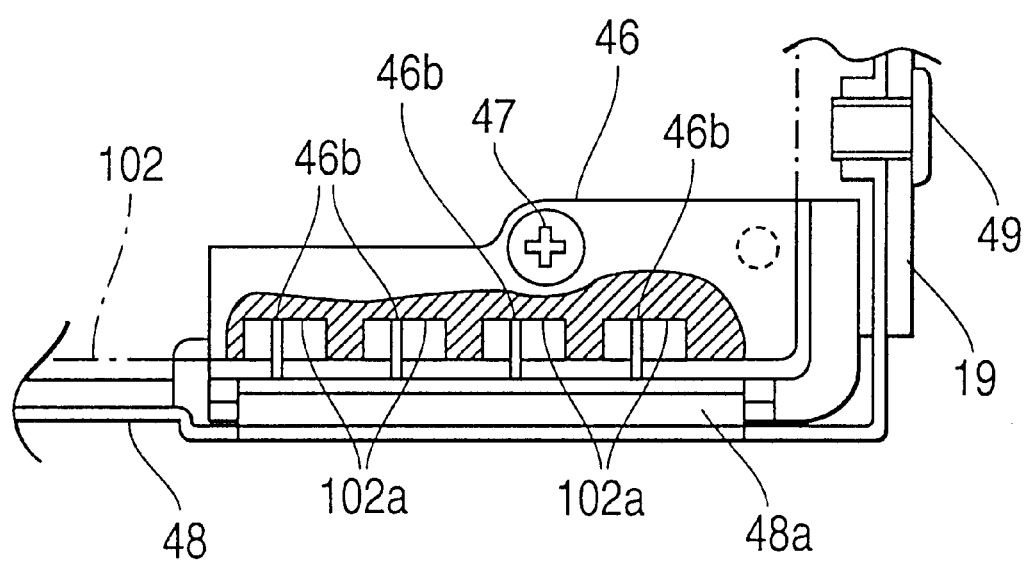
FIG. 15 is a magnified plan view of an MIC-SW of the magnetic recording and reproducing apparatus in the embodiment of the invention.
Figure 16:
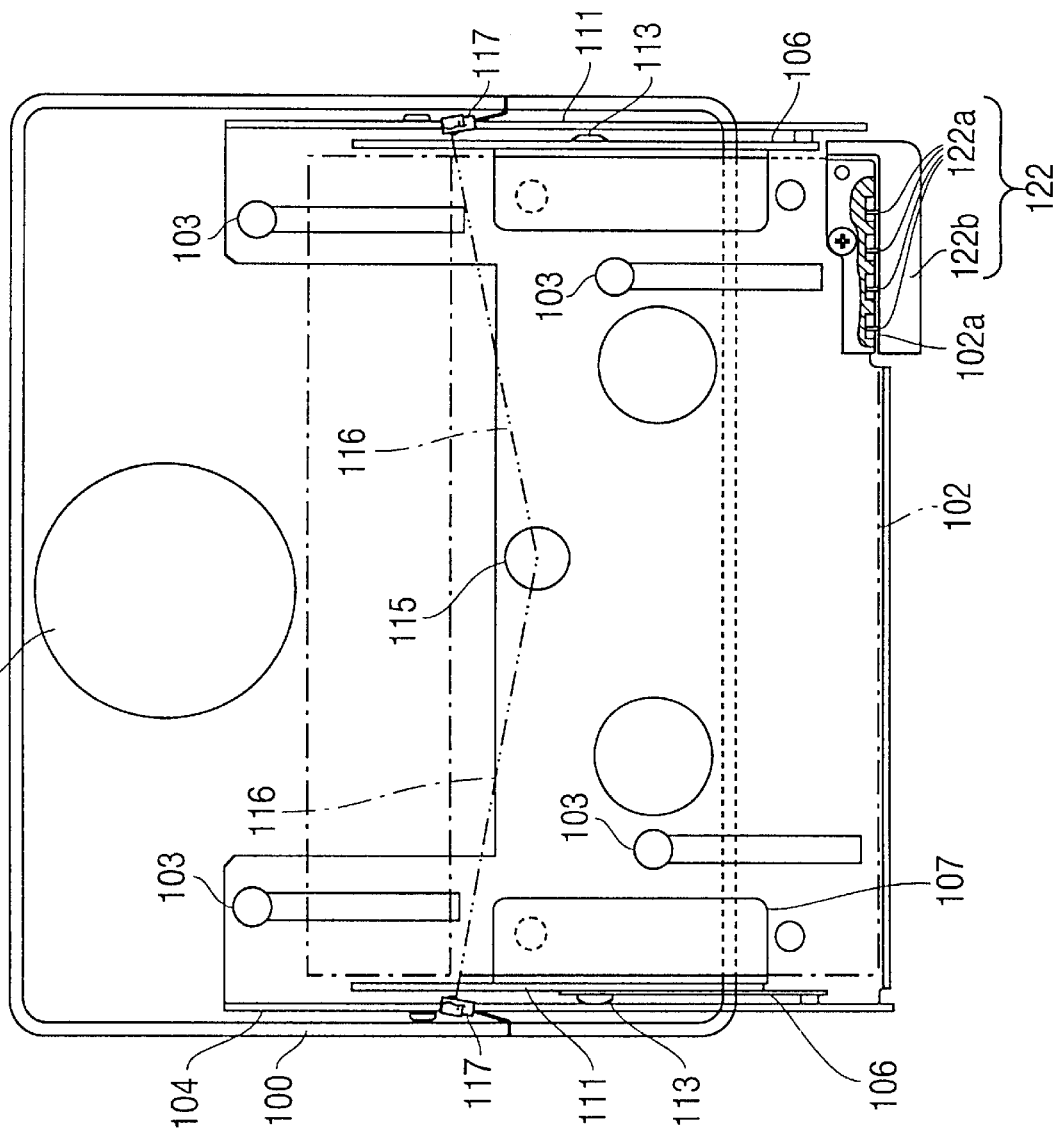
FIG. 16 is a plan view of a conventional magnetic recording and reproducing apparatus in an unload position.
Figure 17:
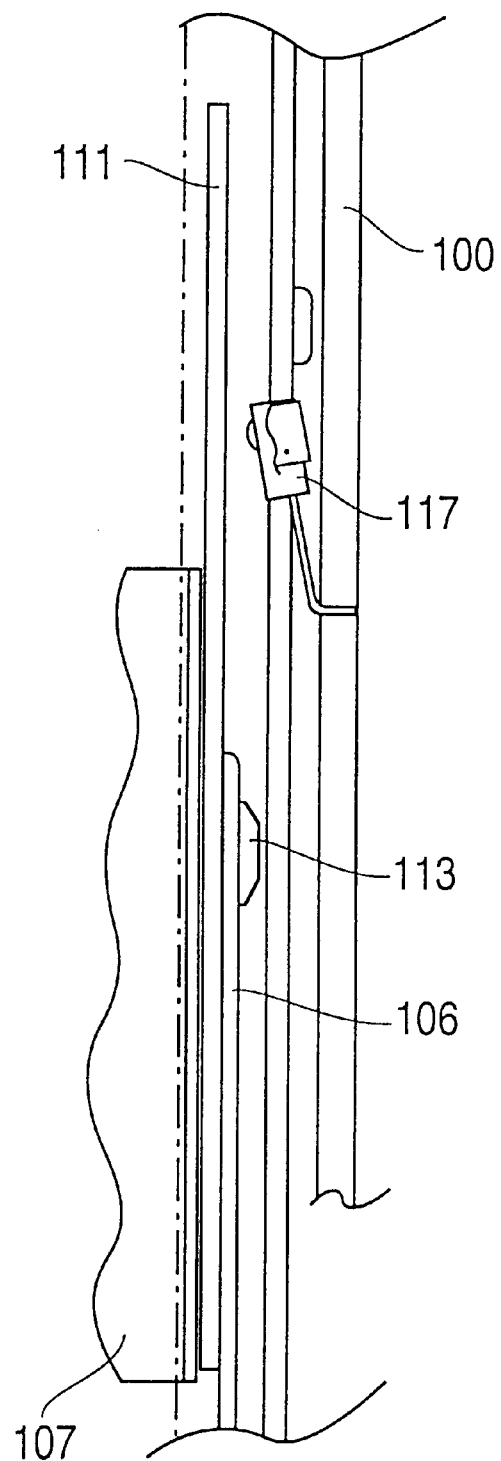
FIG. 17 is a magnified plan view of essential parts of FIG. 16.
Figure 18:
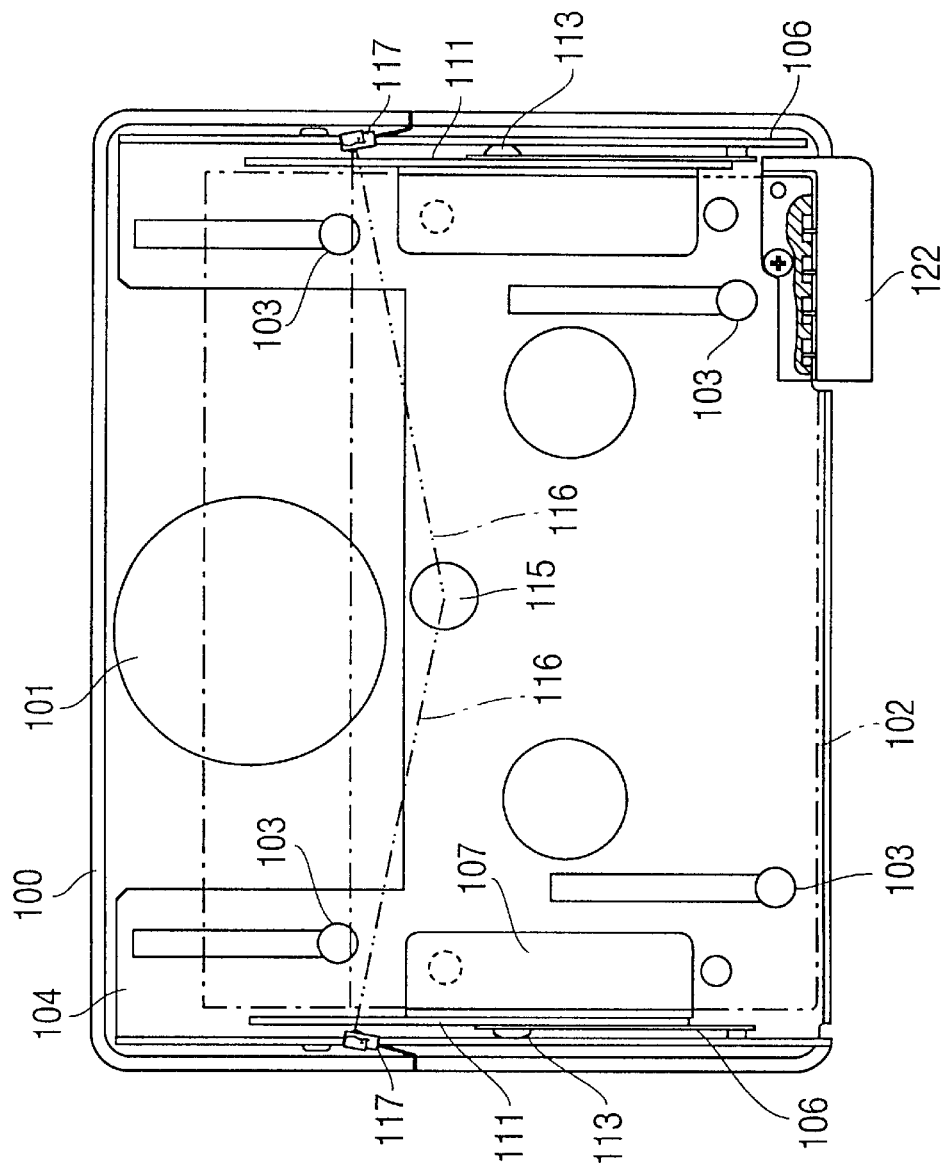
FIG. 18 is a plan view, in a loading completed position, of the conventional magnetic recording and reproducing apparatus.
Figure 19:
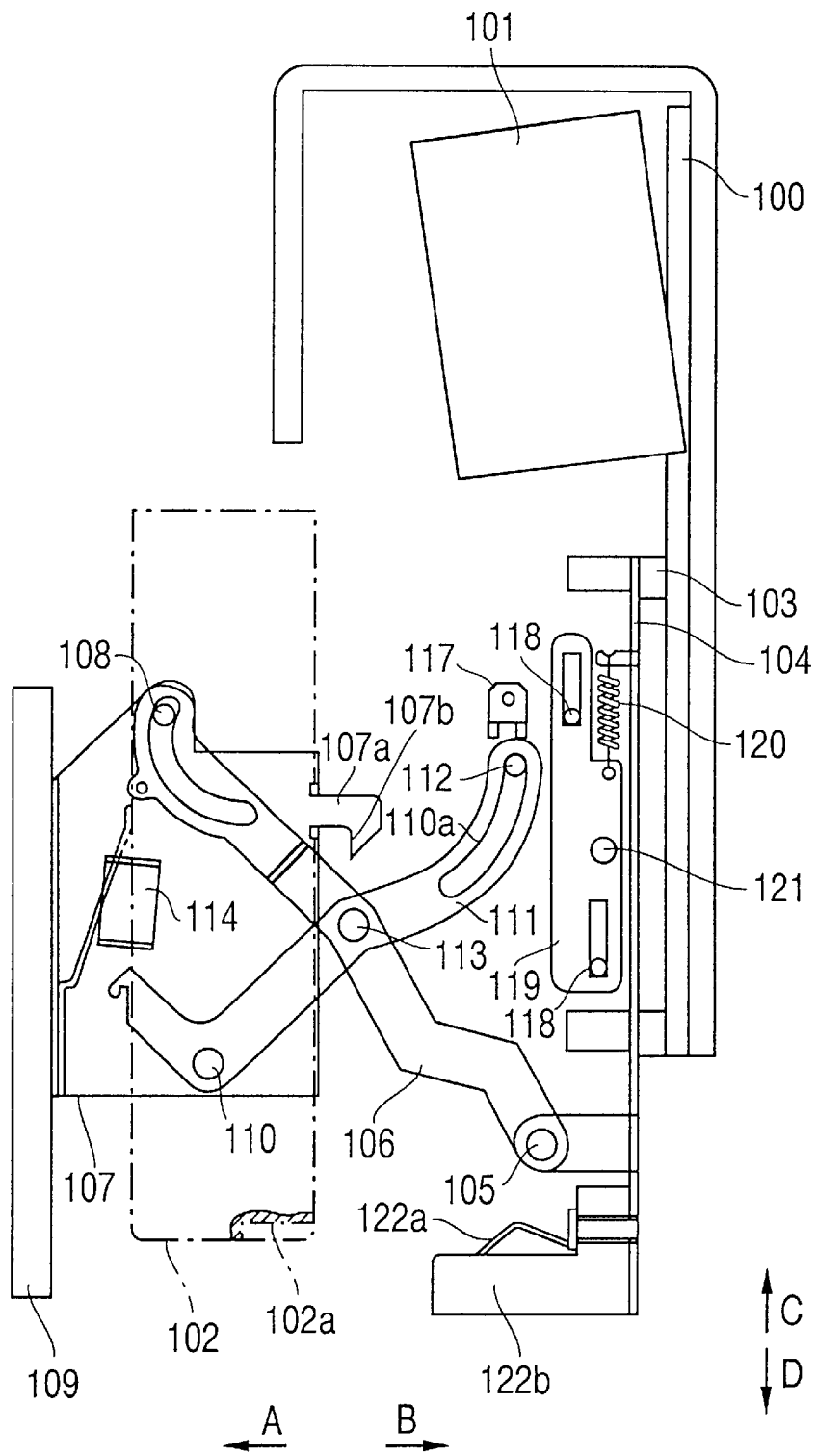
FIG. 19 is a right side view of FIG. 16 in a cassette attaching and detaching position.
Figure 20:
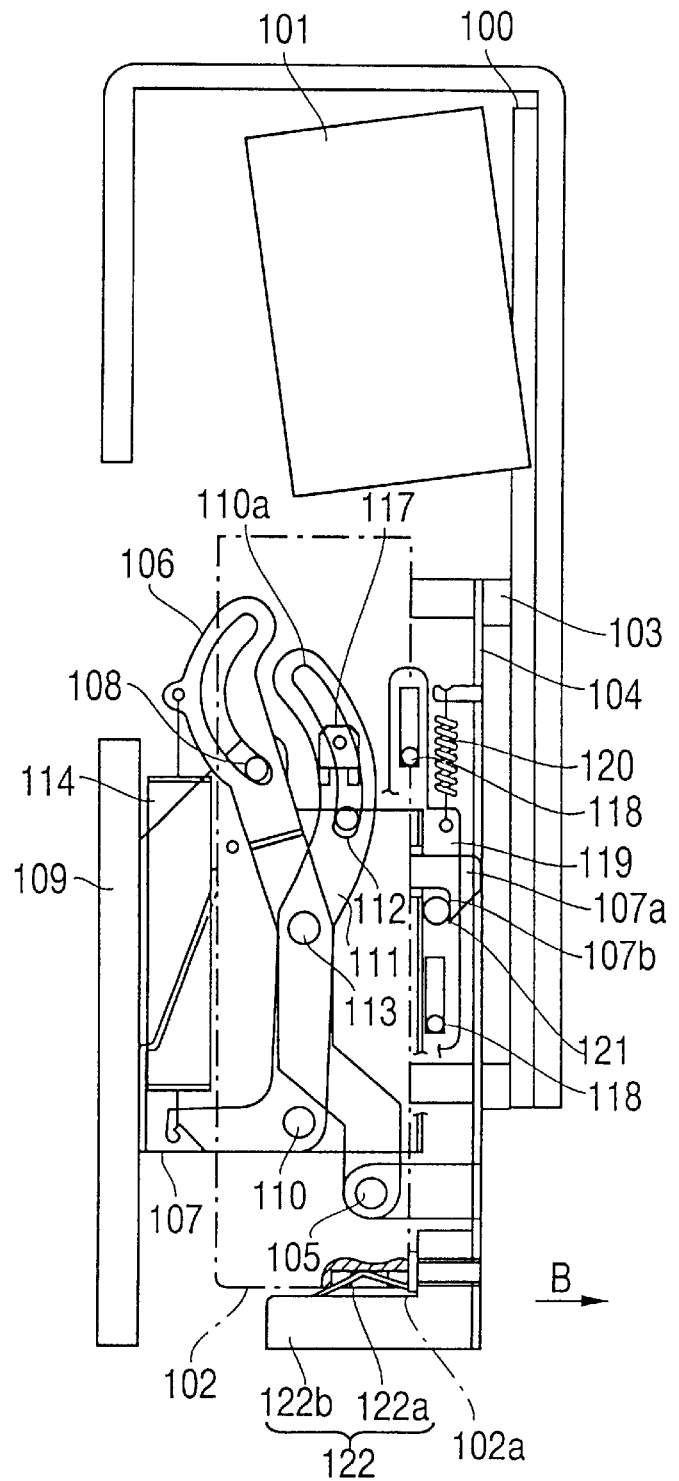
FIG. 20 is a right side view of FIG. 16 of a cassette in a tape loading position.
Figure 21:
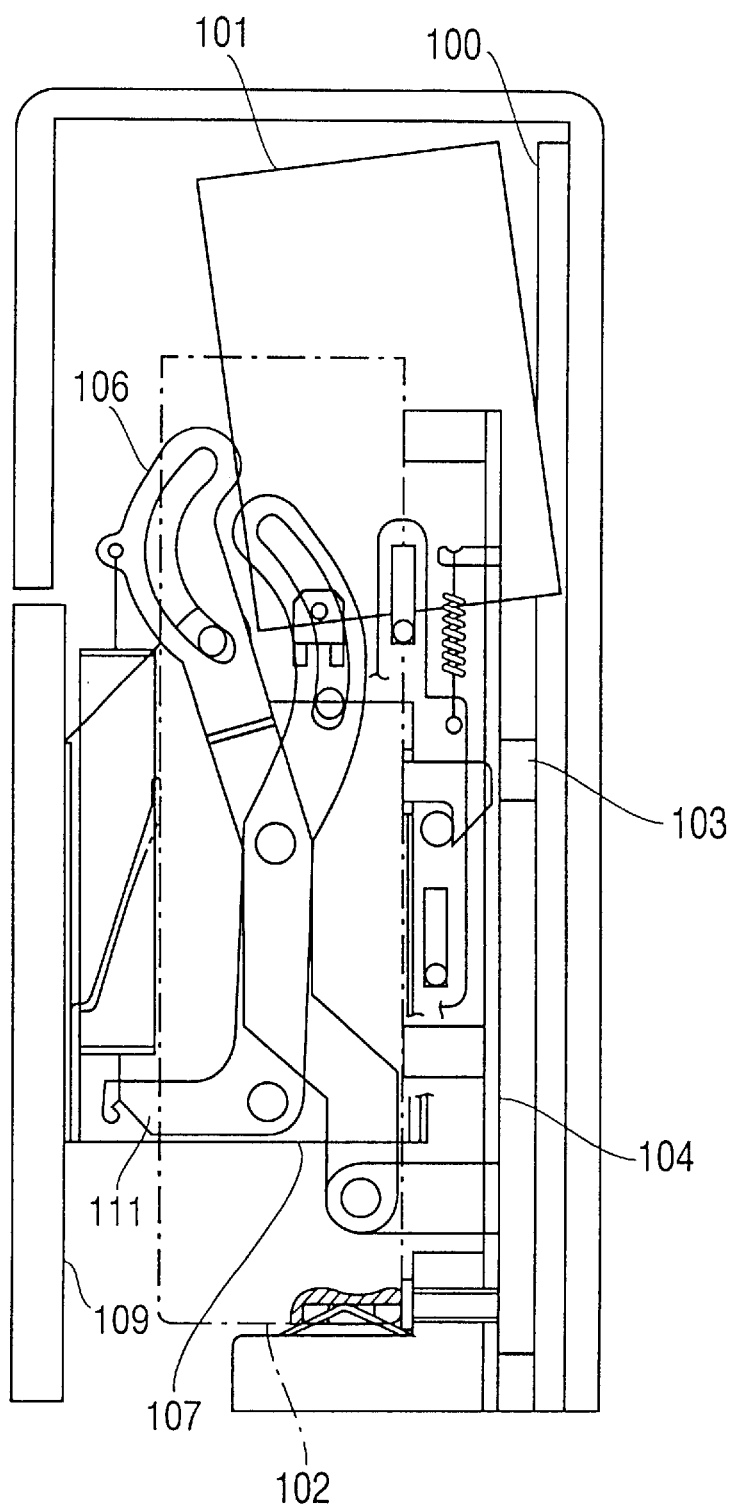
FIG. 21 is a right side view of FIG. 18.
Figure 22:
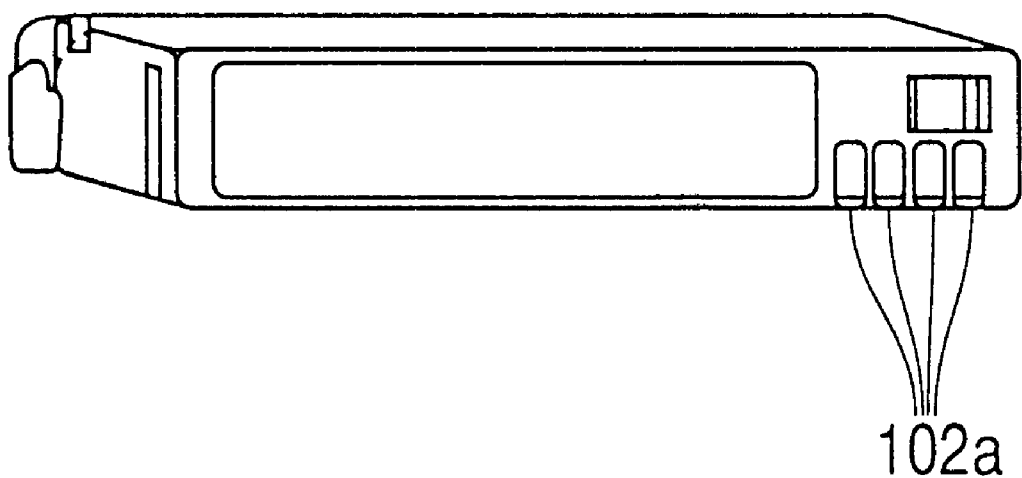
FIG. 22 is a perspective view showing the appearance of a DVC cassette.

FIG. 1 is a plan view showing a chassis construction in an unload position of a magnetic recording and reproducing apparatus in an embodiment of the invention, FIG. 2 is a magnified plan view of essential parts of FIG. 1, FIG. 3 is a plan view showing a chassis construction in a loading completed position, FIG. 4 is a plan view showing a cassette holder moving mechanism provided in an outer casing, FIG. 5 is a left side view in a cassette attaching and detaching position, FIG. 6 is a left side view showing the cassette positioned on the sub-chassis in an unload position, FIG. 7 is a right side view in a cassette attaching and detaching position, FIG. 8 is a right side view showing the cassette positioned on the sub-chassis in an unload position, FIG. 9 to FIG. 11 are right side views showing operation of a damper which is a stopping mechanism, FIG. 12 to FIG. 14 are right side views showing ascending and descending motion of a cassette holder, and FIG. 15 is a magnified plan view of a MIC-SW.

First is described the cassette holder moving mechanism provided in an outer casing 1. In FIG. 4 and FIG. 5, a rotary shaft 4 is provided on a left out-stand 2 and a right out-stand 3 fixed on the outer casing 1, and an out-holder 5 is rotatably provided around the rotary shaft 4. An up-spring 6 is stretched between the outholder 5 and the left out-stand 2, such that the out-holder 5 is always thrust in the counterclockwise direction as shown in FIG. 5, while stoppers 7 are formed on the left out-stand 2 and right out-stand 3, respectively, in order to prevent the out-holder 5 from rotating further from the position shown in FIG. 5 in the counterclockwise direction.

Also as shown in FIG. 5, a lock plate 9 is slidably provided on a lock plate guide pin 8 set up on the left out-stand 2, and the lock plate 9 is always thrust in the direction of arrow C by virtue of a lock plate spring 10 stretched between the lock plate 9 and the left out-stand 2. A lock plate pin 11 is provided on the lock plate 9, and the lock plate pin 11 is designed to contact with a cam face 5a formed in the out-holder 5. The cam face 5a has a concentric arc shape centered on the rotary shaft 4. An out-holder pin 12 is provided at the leading end of the out-holder 5, and is engaged with a lock portion 9b having a slant 9a formed on the lock plate 9. The outer-holder 5 is unlocked by sliding the lock plate 9 in the direction of arrow D through operation of a loading motor (not shown).

As shown in FIG. 4 and FIG. 5, the out-holder 5 is provided with drive units 15 at right and left sides for reciprocally moving a cassette holder 13, described later, by engaging with a holder shaft 14 projecting from both sides of the cassette holder 13. As shown in FIG. 5 to FIG. 7, the drive unit 15 is composed of a fixing portion 16 fixed to the side of the out-holder 5, and a plate spring 17 having a fixed end at the back side of the out-holder 5 and a free end contacting with the fixing portion 16.

Therefore, the plate spring 17 is designed to deflect from the state shown in FIG. 5 in the counterclockwise direction. Further, the left out-stand 2 is provided with a down-detection SW 18 for being activated by engaging with the leading end 9c of the lock plate 9. As shown in FIG. 6, as the out-holder 5 rotates in the clockwise direction, the lock plate 9 slides in the direction of arrow C, the out-holder pin 12 is engaged with the lock portion 9b, and via the leading end 9c of the lock plate 9 the down-detection SW 18 is changed from an OFF state to an ON state, whereby the loading motor (not shown) is put in operation such that loading of a tape and moving of a sub-chassis 19 described below results.

Construction other than that of the cassette holder moving mechanism is described below.

In FIG. 1 and FIG. 3, a rotary head cylinder 21 is mounted on a main chassis 20, and is to exchange signals with a tape incorporated in a cassette 102. The sub-chassis 19 is slidably mounted on a sub-chassis guide pin 22 provided on the main chassis 20. A cassette height determining pin 23 and a cassette holder height determining pin 24, for determining the allowable descending position of the cassette holder 13 holding the cassette 102, are provided on the sub-chassis 19. As shown in FIG. 7. a main arm 26 is provided rotatably about a main arm shaft 25 formed on the sub-chassis 19, and one end of the main arm 26 is slidably engaged with a main arm pin 27 provided at a side of the cassette holder 13.

A sub-arm 29 is provided rotatably about a sub-arm shaft 28 provided on the side of the cassette holder 13, and one end of the sub-arm 29 is slidably engaged with a sub-arm pin 30 provided at a side of the sub-chassis 19. The cassette holder 13 is designed to be limited when ascending and descending by virtue of both main arm 26 and sub-arm 29. The sub-arm pin 30 is positioned between a photo detector 31 described below and the sub-chassis 19.

Therefore, as shown in FIG. 7 and FIG. 12 to FIG. 14, the main arm 26 and sub-arm 29 are designed to move in a plane containing the main arm 26, the sub-arm 29, and the photo detector 31, at positions not intersecting with a detection direction of the photo detector 31. The main arm 26 and sub-arm 29 are rotatably engaged with each other about an arm coupling pin 32. As shown in FIG. 2 and FIG. 7, the plane of the main arm 26, including a slot 26a, is identical with the moving plane of the subarm 29, and the dimension in direction A in FIG. 2 is designed to be as small as possible.

In the cassette holder 13, a cassette pressing spring 33 is incorporated for pressing the cassette 102 against the cassette height determining pin 24, such that the cassette 102 is always thrust in the direction of arrow B in FIG. 7. Further, as shown in FIG. 1 and FIG. 7, a lid opener 35 is provided rotatably about a lid opener shaft 34 provided at the right side of the sub-chassis 19, and the lid opener 35 is always thrust in the counterclockwise direction in FIG. 7 by a lid opener spring 36. A lid opening pin 37 projecting from the leading end of the lid opener 35 is engaged with a front lid 102b of the cassette 102, so that the front lid 102b may be released to a maximum angle.

As shown in FIG. 1 and FIG. 7, a light emitter 38 is provided at a specified position on the sub-chassis 19, and the light 39 emitted from the light emitter 38 is divided into two directions, passes through the tape (not shown) in the cassette 102, and reaches the photo detectors 31 that are fixed via sensor holders 40 provided at both ends of the sub-chassis 19. The functions of the light emitter 38 and photo detector 31 are the same as in the prior art, but what is different is, as shown in FIG. 2, the photo detector 31 is disposed at a further inner side of the apparatus, as compared with the prior art. That is, the photo detector 31 is disposed closer to the side of the cassette 102.

Moreover, a damper 42 is rotatably provided on a damper shaft 41 installed at a side of the sub-chassis 19. As shown in FIG. 7 through FIG. 11, a damper pin 43 is provide at one end of the damper 42 extended downward through the sub-chassis 19, and the damper pin 43 is designed to be always engaged with the outer circumference 44 of the main chassis 20. The outer circumference 44 functions as a cam and includes a groove.

A hook portion 42a provided at another end of the damper 42 has a concentric arc shape centered on the damper shaft 41, and is engaged with a holder clamp pin 45 provided at the side of the cassette holder 13.

In addition, as shown in FIG. 8 and FIG. 15, a thin type MIC-SW 46 having a terminal 46b is provided at a position engaged with an ID board 102a at the back side of a cassette 102, and the MIC-SW 46 is fastened to the sub-chassis 19 with a screw 47. The leading end 46a of the MIC-SW 46 is gripped by a back plate 48 having a pi-shaped cover 48a. In order that the back side of the cassette 102 is not be caught by the leading end of the pi-shaped cover 48A when raising or lowering the cassette 102, the leading end 46a of the MIC-SW 46 is thinner than other portions thereof.

Further, since the back plate 48 is fastened to the side of the sub-chassis 19 with a screw 49, the MIC-SW 46 is supported at both ends by the screw 47 and cover 48a.

The main arm 26, main arm pin 27, sub-arm 29, sub-arm shaft 28, holder shaft 14, and holder clamp pin 45 are disposed at both sides of the cassette holder 13. The main arm shaft 25, sub-arm pin 30, and damper 42 are disposed at both sides of the sub-chassis 19, and the shape of the outer circumference 44 of the main chassis 20 is symmetrical on both right and left sides in FIG. 1. When the cassette holder 13 is lowered to the position shown in FIG. 8, the force of the plate spring 17 of the out-holder 5 pressing the cassette holder 13 is set sufficiently larger than the force of the cassette pressing spring 33 pressing the cassette 102, and when the sub-chassis 19 is moved from the position shown in FIG. 8 to the position shown in FIG. 11, it is designed so that the holder shaft 14 and the plate spring 17 are completely spaced from each other.

Thus, in the invention, a lock mechanism is provided at the side of the out-holder 5 which includes the cassette holder moving mechanism.

In the magnetic recording and reproducing apparatus, its operation is described below.

First, the descending action of the cassette holder 13 is described.

In FIG. 5, when the out-holder 5 is pushed in the direction of arrow B by resisting the thrusting force of the up-spring 6, the cassette holder 13 begins to descend as its holder shaft 14 is guided by the fixing portion 16, and then descends further as pressed by the plate spring 17. Cooperating with this action of the cassette holder 13, the main arm 26 and sub-arm 29 arrive at the position shown in FIG. 14 from the position shown in FIG. 7 through the positions shown in FIG. 12 and FIG. 13. In the process of this action, the sub-arm 29 moves while passing through supporting structure of the photo detector 31 and sub-chassis 19. In FIG. 7, during descension thereof, the cassette 102 in the cassette holder 13 is engaged with the terminal 46b of the MIC-SW 46 without being caught by the cover 48a of the back plate 48. Turning attention to the front face of the cassette 102, a front lid 102b is engaged with the lid opening pin 37, and is released to a maximum angle by the thrusting force of the lid opener spring 36.

At the left side as shown in FIG. 5, although the lock plate 9 is stopped at the left out-stand 2 while its lock plate pin 11 is engaged with the cam face 5a of the out-holder 5, when the out-holder pin 12 begins to be engaged with the slope 9a of the lock plate 9, the lock plate 9 gradually slides in the direction of arrow D by resisting the thrusting force of the lock plate spring 10. Afterwards, as shown in FIG. 6, by the thrusting force of the lock plate spring 10, the out-holder 5 is locked by the lock plate pin 11 of the lock plate 9, and the down-detection SW 18 is changed from an OFF state to an ON state. At the position shown in FIG. 6, the cassette holder 13 is simultaneously receiving the force in the direction of arrow A by the cassette pressing spring 33 through the cassette 102, and the force in the direction of arrow B by the plate spring 17 of the out-holder 5. However, since the latter force is set larger than the former as mentioned above, the cassette holder 13 remains in contact with the cassette holder height determining pin 24. The bottom of the cassette 102 contacts the cassette height determining pin 23 by the thrusting force of the cassette pressing spring 33.

The loading operation by moving of the sub-chassis 19 is described below. When the down-detection SW 18 is turned on, the loading motor (not shown) is operated, and the sub-chassis 19 begins to move in the direction of arrow C. Then, as shown in FIG. 9, the damper 42 on the sub-chassis 19 rotates in the clockwise direction in FIG. 9 by virtue of engagement between the outer circumference 44 of the main chassis 20 and the damper pin 43, such that the hook 42a is engaged with the holder clamp pin 45 at the side of the cassette holder 13. In FIG. 9, the cassette holder 13 is held against the cassette holder height determining pin 24 by virtue of the plate spring 17, and the cassette 102 is pressed against the cassette height determining pin 23 by virtue of the cassette pressing spring 33. Consequently, when the sub-chassis 19 is further moved, as shown in FIG. 10, the damper 42 remains stationary relative to the sub-chassis 19, while the holder shaft 14 of the cassette holder 13 begins to depart from the plate spring 17 of the out-holder 5. Therefore, the cassette holder 13 receives only the reaction in the direction of arrow A by the cassette pressing spring 33 through the cassette 102, and maintains the hook 42a of the damper 42 in contact with the holder clamp pin 45. By this reaction, the bottom of the cassette holder 13 is departed from the cassette holder height determining pin 24. However, by the cassette pressing spring 33, the cassette 102 is held against the cassette height determining pin 23. When the sub-chassis 19 further moves, as shown in FIG. 11, the plate spring 17 of the out-holder 5, and the holder shaft 14 of the cassette holder 13 are further separated from each other, and the cassette holder 13 and the out-holder 5 are completely separated. On the other hand, the cassette 102 continues to be pressed against the cassette height determining pin 23 by virtue of the cassette pressing spring 33.

To the contrary, when taking the cassette 102 out of the apparatus, the unloading operation is in the reverse procedure of the loading operation mentioned above. First, by the loading motor (not shown), the sub-chassis 19 moves in the direction D in FIG. 11. The cassette holder 13 is gradually pressurized by the plate spring 17 of the out-holder 5, and the bottom of the cassette holder 13 contacts with the cassette holder height determining pin 24. Then, when the moving of the sub-chassis 19 is complete up to the position shown in FIG. 8, the damper 42 rotates in the counterclockwise direction due to the engagement of the damper pin 43 with the outer circumference 44 of the main chassis 20, and becomes disengaged from the holder clamp pin 45. Therefore, the cassette holder 13 is set in a waiting state to be movable to the cassette attaching and detaching position. On the other hand, at the left side, the lock plate 9 is driven in the direction of arrow D in FIG. 6 by the loading motor (not shown), and the moment the lock portion 9b is spaced from the out-holder pin 12, the out-holder 5 is rotated in the counterclockwise direction in FIG. 6 by the thrusting force of the up-spring 6. In cooperation with this action of the out-holder 5, the cassette holder 13 is guided and raised by its holder shaft 14 to the plate spring 17 and fixing portion 16, and the out-holder 5 abuts against either stopper 7 of the left out-stand 2 or right outstand 3, thereby finishing the moving action.

The operation while the cassette 102 is not in the cassette holder 13 is the same as the operation mentioned above except that the cassette holder 13 is free from the reaction of the cassette pressing spring 33, and its description is omitted.

Thus, according to the embodiment, when the cassette holding mechanism is moving reciprocally between the cassette attaching and detaching position and the chassis installing position, one of the pair of arms for driving the cassette holding mechanism moves at the opposite side of the chassis to the detecting member, and the other arm is guided by the guide pin and moves at the chassis side to the detecting member. Therefore, the pair of arms can drive the cassette holding mechanism through movement in the plane containing the pair of arms and the detecting member, without intersecting with the detection direction of the detecting member, so that the width of the apparatus can be reduced.

Moreover, with regard to the cassette judging member fixed to the chassis and the protective member for gripping the cassette judging member, since the cassette judging member is thinner than in the prior art, the operation reliability is assured, and the depth of the apparatus can be reduced.

Further, the main chassis has the cam portion, the sub-chassis is movable reciprocally between the unloading position for drawing out the tape from the cassette, and the loading position capable of recording or reproducing by the rotary head cylinder. The cassette holder is reciprocally movable between the installing position for placing the cassette in the sub-chassis and the cassette attaching and detaching position. The stopping mechanism is engaged with the cam portion of the main chassis, and is held at a releasing position for allowing the reciprocal motion of the cassette holder between the installing position and the cassette attaching/detaching position while the sub-chassis is at the unloading position. The stopping mechanism is also held at a lock position for holding the cassette holder on the sub-chassis while the sub-chassis is at the loading position. Accordingly, since the external force acting on the outer casing when recording or reproducing is being performed, does not propagate to the internal mechanisms, distortion or deformation does not occur, such that the apparatus is of high reliability.

In the invention, the MIC-SW is used as the cassette judging member, but other switches may be similarly used so long as these switches have the function of engaging with the cassette case. These other switches can include a wrong erasing preventive switch.

Industrial Applicability

Accordingly, the inventive apparatus comprises a chassis, a cassette holder for holding a cassette incorporating a tape, and a moving mechanism composed of a pair of mutually rotatably supported arms, for moving reciprocally the cassette holder between a first position for attaching or detaching the cassette to the cassette holder, and a second position for placing the cassette in the chassis. A detecting mechanism is also included, which has a detecting member provided adjacent to the side of the cassette, for detecting the starting or ending position of the tape, and a guide pin provided near the detecting member at the chassis side, such that while the cassette holder is moving reciprocally between the first position and the second position, one of the pair of arms moves at the opposite side of chassis with respect to the detecting member, and the other arm is guided by the guide pin and moves at the chassis side with respect to the detecting member. Therefore, the pair of arms moves without intersecting with a detection direction of the detecting member, while the arms move within a plane including the detecting member and the arms. The arms drive the cassette holder, so that the degree of freedom in designing the apparatus is expanded, while simultaneously contributing to downsizing of the apparatus. Specifically, a substantial reduction of the width of the apparatus can be realized.

The inventive apparatus also comprises a chassis, a cassette judging member fixed to the chassis and engageable with the back side of a cassette, for judging the type of cassette, and a protective member provided in the chassis for gripping the cassette judging member. Since the cassette judging member is fixed and supported by both the chassis and the protective member, because the cassette judging member is thinner than in the prior art, the operation reliability is assured, and downsizing of the apparatus, in particular a reduction of a depth dimension of the apparatus, can be realized.

The inventive apparatus moreover comprises a main chassis on which a rotary head cylinder is mounted. The main chassis also has a cam portion. A sub-chassis is movable reciprocally between an unloading position for drawing out a tape from a cassette, and a loading position capable of recording or reproducing information to or from the tape by the rotary head cylinder. A cassette holder is movable reciprocally between an installing position for placing the cassette in the sub-chassis and a cassette attaching/detaching position. A stopping mechanism is engaged with the cam portion of the main chassis, and allows for the reciprocal motion of the cassette holder between the installing position and the cassette attaching/detaching position when the sub-chassis is at the unloading position, and also allows for holding the cassette holder on the sub-chassis when the sub-chassis is at the loading position. Therefore, since the external force acting on the outer casing, when recording or reproducing is being performed, does not propagate to the internal mechanisms through the cassette holder, distortion, deformation or malfunction of the apparatus is prevented, and an apparatus of high reliability is presented.

Still further, the cassette holder can be locked and unlocked securely by making use of both the external shape of the chassis and the relative moving operation of the sub-chassis relative to the chassis. Thrusting structure such as a spring or the like is not required for locking, as is needed in the prior art, and therefore an extremely inexpensive apparatus of high cost performance is presented, and practical effects of the apparatus are outstanding.

What is claimed is:

1. A magnetic recording and reproducing apparatus comprising:

a chassis having a first side;

a cassette holder to hold a cassette incorporating a tape;

a moving mechanism to reciprocally move said cassette holder between a first position at which the cassette is to be loaded onto or unloaded from said cassette holder and a second position at which the cassette is to be received within said chassis when the cassette is held by said cassette holder, wherein said moving mechanism includes a pair of arms; and a detector positioned adjacent said cassette holder, to detect a starting or ending position of the tape when the cassette is held by said cassette holder and received within said chassis;

wherein as said cassette holder is moved between the first position and the second position, said arms move generally parallel to said first side of said chassis such that a line passing through said detector perpendicularly to said first side does not intersect either one of said arms, and wherein said chassis further has a second side extending generally orthogonal to said first side, and said apparatus further comprises a guide pin positioned between said detector and said second side of said chassis to guide one of said arms as said cassette holder is moved between the first position and the second position, such that as said cassette holder is moved between the first position and the second position, the line passing through said detector perpendicularly to said first side is prevented from intersecting with said one of said arms due to the positioning of said guide pin between said detector and said second side.

2. The magnetic recording and reproducing apparatus according to claim 1, wherein said arms are mutually rotatably supported.

3. The magnetic recording and reproducing apparatus according to claim 2, wherein the other one of said arms includes a non-linear configuration, and wherein said cassette holder is moved between the first position and the second position by mutually rotating said arms, and the line passing through said detector and said first side is prevented from intersecting with said other one of said arms due said non-linear configuration of said other one of said arms.

4. The magnetic recording and reproducing apparatus according to claim 2, wherein said arms are mutually rotatable within a plane containing said detector.

5. The magnetic recording and reproducing apparatus according to claim 1, wherein said arms are mutually rotatable within a plane containing said detector.

6. The magnetic recording and reproducing apparatus according to claim 1, wherein the other one of said arms includes a non-linear configuration, and the line passing through said detector and said first side is prevented from intersecting with said other one of said arms, during movement of the cassette holder between the first and second position, due said non-linear configuration of said other one of said arms.

* * * * *